(12) United States Patent
Cutler et al.

(10) Patent No.: US 7,565,331 B2
(45) Date of Patent: Jul. 21, 2009

(54) METHOD FOR MODELING PROCESSES IN AIRLINES AND OTHER INDUSTRIES, INCLUDING COST ASSSESMENT OF SERVICE DISRUPTIONS

(75) Inventors: Gerald R. Cutler, Kirkland, WA (US);
Philip L. Trautman, Kent, WA (US);
Michael E. Irrgang, Houston, TX (US)

(73) Assignee: The Boeing Company, Chicago, IL (US)

( * ) Notice: Subject to any disclaimer, the term of this patent is extended or adjusted under 35 U.S.C. 154(b) by 487 days.

(21) Appl. No.: 11/364,255

(22) Filed: Feb. 28, 2006

(65) Prior Publication Data

US 2007/0203762 A1    Aug. 30, 2007

(51) Int. Cl.
G06Q 10/00    (2006.01)
G06F 17/00    (2006.01)

(52) U.S. Cl. .............................. 705/400; 705/1; 705/5; 705/6

(58) Field of Classification Search ................ 705/1, 705/5–6, 400
See application file for complete search history.

(56) References Cited

U.S. PATENT DOCUMENTS

| | | | | |
|---|---|---|---|---|
| 5,652,867 A * | 7/1997 | Barlow et al. | ................... | 703/6 |
| 6,314,361 B1 * | 11/2001 | Yu et al. | ..................... | 701/120 |
| 2003/0191678 A1 * | 10/2003 | Shetty et al. | ................... | 705/8 |
| 2003/0225600 A1 * | 12/2003 | Slivka et al. | ................... | 705/5 |
| 2005/0165628 A1 * | 7/2005 | Vaaben et al. | ................... | 705/5 |
| 2006/0112139 A1 | 5/2006 | Maple et al. | | |

OTHER PUBLICATIONS

Rockwell, Collins, "Integrated Information System", 1999, pp. 1-12.*

* cited by examiner

*Primary Examiner*—John W Hayes
*Assistant Examiner*—Fadey S Jabr
(74) *Attorney, Agent, or Firm*—Tung & Associates

(57) ABSTRACT

Methods and systems for modeling functional processes in enterprises, and for simulating and valuing the effects of various products and services on those processes, are described herein. The cost of disruptions in service of commercial fleets of transportation vehicles such as aircraft, is assessed. The causes of the disruptions are determined and for each such cause, disruption events are classified according to their duration. The cost factors are established and then accumulated to reflect the cost per cause and severity of disruption. Curves are developed that allow users to identify the disruptions that are most costly.

16 Claims, 32 Drawing Sheets

| FLEET INFORMATION | AIRLINE PROCESS MODEL | CHALLENGE CHOOSER | SOLUTION CHOOSER | AIRLINE OPERATIONS | VALUE CALCULATOR |

Case Name: What If-134
Model:
Date: 10/22/2004
Time: 11:33:11 AM — 1182

Products: AHM, PMA, Reliability Program with Component Oversight, Task Card Updates
Notes: This is to simulate step 1 return to case summary

[RUN CASE] 1184a    [CALC] 1184b    [EDIT] 1184c    [DELETE] 1184d    [CREATE] 1184e    [AIRLINE OPS]

| | | | | | | |
|---|---|---|---|---|---|---|
| FLEET INFORMATION | AIRLINE PROCESS MODEL | CHALLENGE CHOOSER | SOLUTION CHOOSER | AIRLINE OPERATIONS | VALUE CALCULATOR | |

CASE SUMMARY

| CASE | MODEL | DATE | TIME | PRODUCTS | |
|---|---|---|---|---|---|
| Delays and Cancellations | | | | | |
| As Is | | 5/30/2004 | 12:00:47 AM | None | Select |
| What If-146 | | 10/28/2004 | 10:20:21 AM | | Select |
| What If-145 | | 10/26/2004 | 3:07:16 PM | AHM, PMA, Reliability Program with Component... | Select |
| What If-144 | | 10/26/2004 | 1:48:37 PM | AHM, PMA | Select |
| What If-143 | | 10/26/2004 | 1:42:53 PM | AHM, PMA, ACM | Select |
| What If-142 | | 10/26/2004 | 1:42:53 PM | | Select |
| What If-141 | | 10/26/2004 | 1:42:53 PM | AHM, PMA | Select |
| What If-140 | | 10/26/2004 | 1:38:18 PM | AHM, PMA, Task Card Updates | Select |
| What If-139 | | 10/26/2004 | 1:14:52 PM | AHM, PMA, Maintenance Program Management | Select |
| What If-138 | | 10/26/2004 | 1:11:54 PM | AHM, PMA, Reusable Solutions (Knowledge Management) | Select |

| | | 737-400 | | | 767-200 | | | 767-300 | | | 747-100 | | | 747-200 | | | 747-300 | | | 747-400 | | | 777-200 | | | 777-300 | | | 7E7-8 | | |
|---|---|---|---|---|---|---|---|---|---|---|---|---|---|---|---|---|---|---|---|---|---|---|---|---|---|---|---|---|---|---|
| | | TI | As Is | Wil | TI | As Is | Wil | TI | As Is | Wil | TI | As Is | Wil | TI | As Is | Wil | TI | As Is | Wil | TI | As Is | Wil | TI | As Is | Wil | TI | As Is | Wil | TI | As Is | Wil |
| Efficiency Productivity & Cost Reduction | Tech. Info. | 8 | | 3 | | | | 31 | | 3 | | | | 18 | | | 14 | | | 42 | | | 14 | | | 8 | | | | | |
| | Config. MM | 8 | | 3 | | | | 31 | | 3 | | | | 18 | | | 14 | | | 42 | | | 14 | | | 8 | | | | | |
| | Crew | 8 | | 3 | | | | 31 | | 3 | | | | 18 | | | 14 | | | 42 | | | 14 | | | 8 | | | | | |
| | AOC | 8 | | 3 | | | | 31 | | 3 | | | | 18 | | | 14 | | | 42 | | | 14 | | | 8 | | | | | |
| | Outsourced | 8 | | 3 | | | | 31 | | 3 | | | | 18 | | | 14 | | | 42 | | | 14 | | | 8 | | | | | |
| Availability & Reliability | Maint. Comp. | 8 | | 3 | | | | 31 | | 3 | | | | 18 | | | 14 | | | 42 | | | 14 | | | 8 | | | | | |
| | Pro Health | 8 | | 3 | | | | 31 | | 3 | | | | 18 | | | 14 | | | 42 | | | 14 | | | 8 | | | | | |
| | Reliability | 8 | | 3 | | | | 31 | | 3 | | | | 18 | | | 14 | | | 42 | | | 14 | | | 8 | | | | | |
| Safety, Security, Reliability | Paperless Fl. Ops. | 8 | | 3 | | | | 31 | | 3 | | | | 18 | | | 14 | | | 42 | | | 14 | | | 8 | | | | | |
| | Maint. Eval. | 8 | | 3 | | | | 31 | | 3 | | | | 18 | | | 14 | | | 42 | | | 14 | | | 8 | | | | | |
| | Train Ops. | 8 | | 3 | | | | 31 | | 3 | | | | 18 | | | 14 | | | 42 | | | 14 | | | 8 | | | | | |
| | Enhanced Fl. Ops. | 8 | | 3 | | | | 31 | | 3 | | | | 18 | | | 14 | | | 42 | | | 14 | | | 8 | | | | | |
| Passenger Exp & Airplane Life Ext | Interior Recessed | 8 | | 3 | | | | 31 | | 3 | | | | 18 | | | 14 | | | 42 | | | 14 | | | 8 | | | | | |
| | Cabin Reconfig. | 8 | | 3 | | | | 31 | | 3 | | | | 18 | | | 14 | | | 42 | | | 14 | | | 8 | | | | | |
| | IFE | 8 | | 3 | | | | 31 | | 3 | | | | 18 | | | 14 | | | 42 | | | 14 | | | 8 | | | | | |
| | PAX to Freighter | 8 | | 3 | | | | 31 | | 3 | | | | 18 | | | 14 | | | 42 | | | 14 | | | 8 | | | | | |

Tabs: FLEET INFORMATION | AIRLINE PROCESS MODEL | CHALLENGE CHOOSER | SOLUTION CHOOSER | AIRLINE OPERATIONS | VALUE CALCULATOR

*Fig. 16*

| Expense Factor | <=15 | <=30 | <=60 | <=120 | <=240 | >240 | Cancellation | Other |
|---|---|---|---|---|---|---|---|---|
| Customer Services | $5 | $10 | $2,270 | $8,040 | $19,160 | $39,700 | $50,000 | $19,700 |
| Ramp Service | $5 | $10 | $20 | $40 | $160 | $200 | $200 | $200 |
| Flight Ops | $25 | $50 | $100 | $6,000 | $8,000 | $16,000 | $23,000 | $22,000 |
| Maintenance | $100 | $100 | $200 | $500 | $4,000 | $24,000 | $30,000 | $320 |
| Weather | $80 | $80 | $80 | $0 | $0 | $0 | $0 | $0 |
| Regulator | $0 | $0 | $0 | $0 | $0 | $0 | $0 | $0 |
| Other | $0 | $0 | $0 | $0 | $0 | $0 | $0 | $0 |

Single Event Weighted Direct Disruption Costs by Expense Factor & Duration Interval

| Cause | <=15 | <=30 | <=60 | <=120 | <=240 | >240 | Cancellation | Other |
|---|---|---|---|---|---|---|---|---|
| Customer Services | $35 | $70 | $2,390 | $14,080 | $0 | $0 | $0 | $0 |
| Ramp Service | $35 | $70 | $2,390 | $14,080 | $0 | $0 | $0 | $0 |
| Flight Ops | $35 | $70 | $2,390 | $14,080 | $0 | $0 | $73,200 | $0 |
| Maintenance | $135 | $170 | $2,590 | $14,580 | $31,320 | $79,900 | $103,200 | $42,220 |
| Weather | $115 | $150 | $2,470 | $0 | $0 | $0 | $73,200 | $41,900 |
| Regulator | $35 | $70 | $2,390 | $14,080 | $27,320 | $0 | $0 | $0 |
| Other | $35 | $70 | $2,390 | $14,080 | $0 | $0 | $0 | $0 |
| Average Single Event Cost | $61 | $96 | $2,430 | $12,140 | $8,377 | $11,414 | $35,657 | $12,017 |

*Figure 21*

METHOD FOR MODELING PROCESSES IN AIRLINES AND OTHER INDUSTRIES, INCLUDING COST ASSSESMENT OF SERVICE DISRUPTIONS

FIELD OF THE INVENTION

This invention generally relates to methods and systems for modeling processes such as those used in airlines, and deals more particularly with a method for assessing the cost of service disruptions, such as delays in airline flights.

BACKGROUND OF THE INVENTION

An airline or other large commercial or non-commercial enterprise typically requires the coordinated efforts of many different functional groups. Generally, each of the different groups is responsible for managing a different part of the enterprise. A typical airline, for example, can include different functional groups for managing flight operations, aircraft maintenance, passenger services, and other aspects of the business necessary for day-to-day operations. The efficiency with which these different functional groups cooperate to run the airline can have a direct effect on the profitability and, ultimately, the success of the airline in a competitive marketplace.

Conventional methods for modeling the complex operations of airlines and other large enterprises typically include process flow charts and other types of schematic diagrams that attempt to illustrate the inter-workings of the different functional groups. Although these methods may illustrate some functional relationships at a relatively high level, they are of limited value in analyzing process interactions because they typically lack detailed information about the various attributes (e.g., cost, time, etc.) associated with each process. Further, these methods also tend to lack a detailed description of the routing and sequencing of information flows between the different functional groups. As a result, such methods offer little assistance in identifying problem areas and assessing the impact of changes to a particular process.

One problem facing companies that produce and market such products and services is how to justify the investment in the product or service to the airline operator. That is, how best to make the business case to the potential customer. A typical marketing approach is to "demo" the product or service using a fictitious business model. The downside of this approach, however, is that the fictitious model may or may not be a realistic simulation of the actual airline. As a result, the airline operator may have a hard time visualizing and understanding the benefits of the product or service, and may remain unconvinced of the value to their airline.

Proving the value of goods and services is particularly difficult where the business case depends on an accurate measurement of the cost of disruptions in airline service. In the past, the cost of service disruptions has been measured using "average" or anecdotally obtained numbers from industry sources by applying them as though costs have a uniform impact over time. Measurement was based on a calculation of the number of disruption events multiplied by the cost per event, or alternatively, the total delay minutes multiplied by a flat rate per minute of service disruption. Although these approaches yield results that are useful when comparing one airline to another, they are usually not accurate when assessing the absolute cost of disruptions for a particular airline. As a result, when the previous techniques are used to assess the impact of service disruptions for a particular airline, the results are either understated or overstated. From a marketing perspective, overstatement can result in the vendor of the proposed goods and services losing credibility with the customer. Understatement may result in reducing the customer's perceived value of the goods and services being offered, or the inability of the vendor to close a sale of a solution that would substantially improve operations and reduce service disruptions.

Accordingly, there is a need for a method of determining the cost of service disruptions, which overcomes the deficiencies discussed above. The present invention is directed toward satisfying this need.

SUMMARY OF THE INVENTION

In accordance with one aspect of the invention, a method is provided for assessing the cost of service disruptions in a fleet of transportation vehicles, such as aircraft. The method comprises the steps of: determining the cause of each of the disruptions; determining the duration of each of the disruptions; determining the number of disruptions from each of the causes occurring during each of a plurality of time intervals; and, determining the cost of the service disruptions based on the number of disruptions within each of the time intervals. Expense factors are assigned to the disruptions resulting from each of the causes and the cost is determined for each disruption using the expense factors. In connection with fleets of commercial aircraft, the causes of the disruptions may include one or more of the following: customer services, aircraft ramp services, aircraft flight operations, maintenance, weather, and government regulators. Graphs are generated which visually represent, for each of the causes, the costs per unit time of the disruption in relation to each of the time intervals.

In accordance with another aspect of the invention, a method is provided of the accessing the cost of service disruptions in a fleet of commercial aircraft, comprising the steps of: identifying the cause of the disruptions; determining the severity of each of the disruptions; and, calculating the cost of disruptions based on the cause and severity of each of the disruptions. Visual models are generated that represent the relationship between the cost of the disruptions per unit time and the severity of the disruption. The disruption durations are grouped in a plurality of time intervals respectively representing the severity of the disruptions.

According to still another aspect of the invention, a method is provided of assessing the cost of service disruptions in a fleet of commercial aircraft, comprising the steps of: identifying a plurality of causes for the service disruptions; for each of the causes, determining the number of disruptions having durations falling within each of a plurality of time intervals; and, calculating the cost of the disruptions based on the causes and the number of disruptions for each of the time intervals. Graphical information is developed that enable a user to determine root causes of disruption sequences.

An important advantage of the invention is that the assessment of cost by cause and severity permits airline operator resources to be focused on correction of service disruptions in those areas providing the highest economic payback. Airline specific curves can be generated that allow the application of established costs in estimating the cost of future operations. The application of costs to the curve enables establishment of savings incurred with purposed operational improvements, when focused on specific causes or severity events. The cost of service disruptions can be calculated more accurately since actual airline data is used and applied to a distribution-of-events curve, rather than applying average or anecdotal costs which are applied in a flat line distribution.

Various additional objects, features and advantages of the present invention can be more fully appreciated with reference to the detailed description and accompanying drawings that follow.

BRIEF DESCRIPTION OF THE DRAWINGS

FIG. 11 is a schematic diagram of a display page listing user options after a "what if" case has been created.

FIG. 13 is a schematic diagram of a display page that provides information about existing "as is" and "what if" event cases.

FIG. 14 is a schematic diagram of a display page for comparing costs associated with an "as is" model to costs associated with a corresponding "what if" model.

FIG. 16 is a schematic diagram of a display page that enables a user to "scale-up" benefits associated with selected products and services.

FIG. 21 is a table showing the single event weighted direct disruption cost by expense factor and duration interval, in accordance with an embodiment of the invention

DETAILED DESCRIPTION OF THE PREFERRED EMBODIMENTS

The following disclosure describes computer-implemented methods and systems for modeling the operations of airlines and other commercial and non-commercial industries, and for simulating and valuing the effects of different products and services on those operations, such as solutions for reducing service disruptions. Specific details of several embodiments of the invention are described below to provide a thorough understanding of the embodiments. Other details describing well-known aspects of airlines and airline operational systems are not set forth below, however, to avoid unnecessarily obscuring the description of the various embodiments. Furthermore, although various embodiments of the invention are described below, those of ordinary skill in the art will understand that the invention can have other embodiments in addition to those described below. Such embodiments may lack one or more of the elements described below or, conversely, they may include other elements in addition to those described below.

Certain embodiments are described below in the context of computer-executable instructions performed by a general-purpose computer, such as a personal computer. The computer-executable instructions can be stored on various types of computer-readable media including, for example, hard disks, floppy disks, or a CD-ROMs. In other embodiments, these instructions can be stored on a server computer system and accessed via a computer network such as an intranet or the Internet. Because the basic structures and functions often associated with computer systems and related routines are well known, they have not been shown or described in detail here to avoid unnecessarily obscuring the described embodiments.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
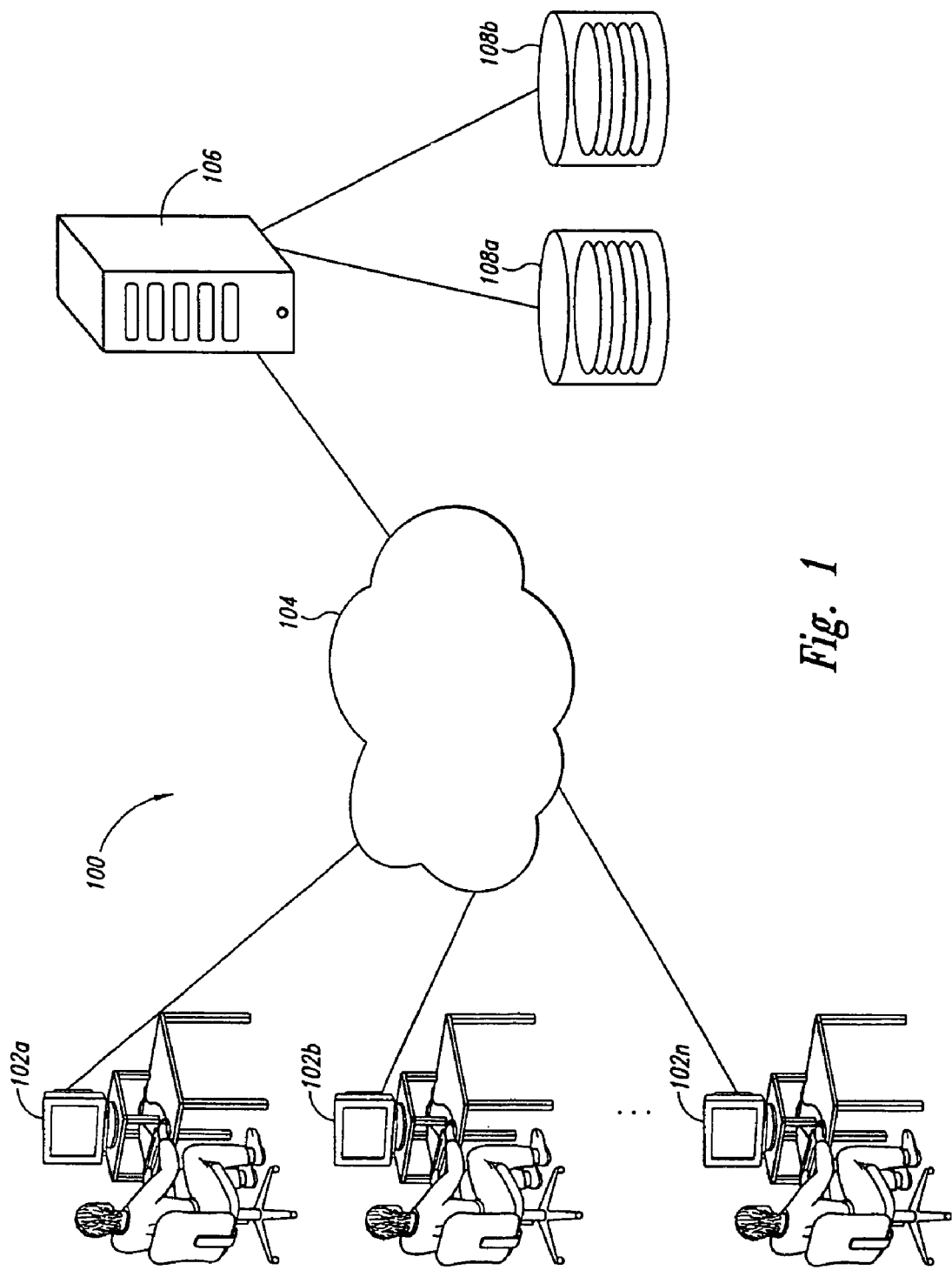
FIG. 1 is a schematic diagram of a system suitable for implementing various embodiments of the present invention.

FIG. 1 is a schematic diagram of a system 100 suitable for implementing various embodiments of the present invention. The system 100 can include a plurality of user computers 102a-n operably connected to a server computer 106 via a communications link 104. Each of the user computers 102 can include a central processing unit, memory devices, input devices (e.g., a keyboard and a pointing device), output devices (e.g., a display screen or other device), and data storage devices (e.g., disk drives). The memory and storage devices can include computer-readable media that contain computer-executable instructions for implementing many of the processes, routines, and display pages of the present invention. As described in greater detail below, these processes, routines, and display pages can be used to model the various operational processes of an airline and graphically simulating the value that various products and services can have on those processes.

The user computers 102 can further include a browser module (not shown) that enables a user to access and exchange data with the server computer 106 and other sites via the communications link 104. The communications link 104 can be a computer network, such as a local area network (LAN), an intranet, or the Internet. The communications link 104 can be implemented using any one of a wide variety of conventional communications configurations including both wired and wireless types. Further, any of a wide variety of communications protocols can be used to transmit data via the communications link 104, including both public and proprietary protocols. The server computer 106 can be configured to retrieve data from a plurality of databases 108a-b and transmit the data in various forms to the user computers 102 via the communications link 104. Such data can include, for example, various information about different airlines, such as fleet size and make-up, routes, etc.

The system 100 is but one example of a suitable system for implementing various embodiments of the invention as described in greater detail below. Accordingly, the methods and systems disclosed herein are not limited to implementation on the system 100, but can be implemented on other types of general- and/or special-purpose computing systems or configurations. Examples of well-known computing systems, environments, and/or configurations that may be suitable for use with aspects of the invention include personal computers (PCs), server computers, portable and hand-held devices such as personal digital assistants (PDAs), laptop and tablet PCs, multiprocessor systems, microprocessor-based systems, set-top boxes, programmable consumer electronics, network PCs, mini-computers, mainframe computers, and/or distributed computing environments that include one or more of the above systems or devices.

Figure 2:
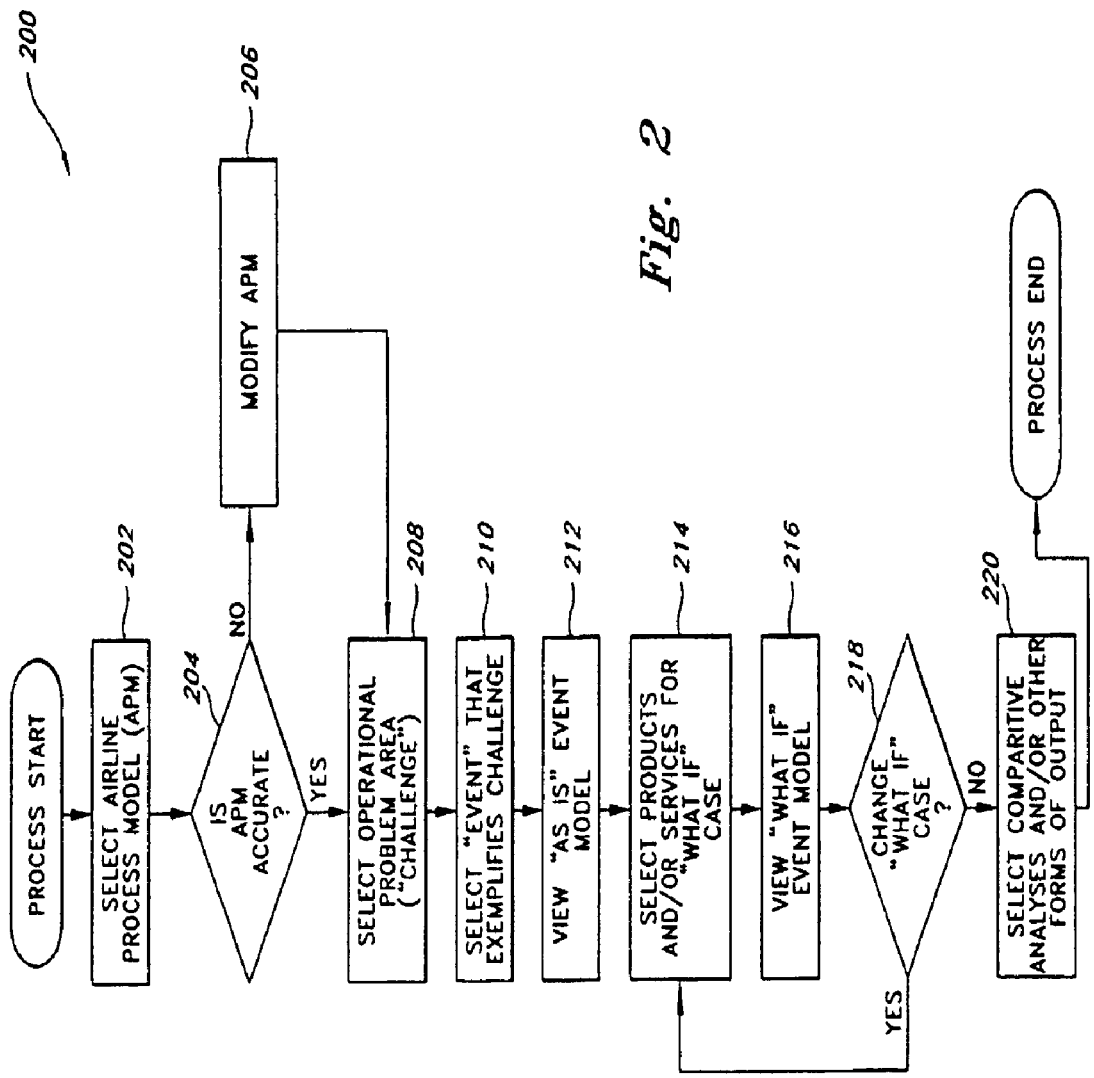
FIG. 2 is a flow-diagram illustrating a process for simulating and/or valuing the effects of various products and/or services on an operational model.

FIG. 2 is a flow diagram illustrating a process 200 for simulating and/or valuing the effects of various products and/or services on an operational model. In one aspect of this embodiment, the process 200 can be performed by a sales agent of the products and services by operating one of the user computers 102 described above with reference to FIG. 1. The sales agent may be performing the process 200 for the benefit of a potential customer who is interested in seeing if there is a business case that would justify purchasing the products and services.

For purposes of illustration, the process 200 is described below in the context of an airline process model. Thus, in this particular embodiment, the process 200 can be used by a seller of airline-related products and services to demonstrate the benefits of the products and services to a potential customer, i.e., an airline operator. As described in greater detail below, such airline-related products and services can include, for example, various software products, database systems, document management systems, and hand-held computational devices that facilitate efficient airline operation. Although the process 200 is described below in an airline context, those of ordinary skill in the art will appreciate that other embodiments of the invention can be used in other commercial and noncommercial industries in various business sectors including both transportation and non-transportation related enterprises. Such industries can include, for example, marine, ground, and space transportation industries; military fleet operations; etc.

In the illustrated embodiment, the process 200 begins in block 202 with the selection of an "as is" airline process model (APM). As used herein, the term "as is" APM refers to an organized assembly of graphical and/or numerical data that describes functions, processes, information elements, and/or other parts of a global air transportation system (GATS). An example of an "as is" APM is described in greater detail below with reference to FIG. 5. In this embodiment, selecting the "as is" APM causes the APM to be displayed on a display screen or other suitable viewing device. The user (e.g., a sales agent) and/or others (e.g., an airline operator) can then view the "as is" APM to gain a better understanding of how the various functional groups in the airline currently interact during normal day-to-day operations. Further, in decision block 204, the user can determine if the "as is" APM accurately reflects the user's understanding of the current airline processes. If not, the user can modify the "as is" APM in block 206. As described in greater detail below, this modification can take the form of manipulating graphical data on the display screen and/or, alternatively, accessing a database to change various input data used to generate the "as is" APM.

After modifying the "as is" APM, or if the "as is" APM was accurate as initially displayed, the user can proceed to block 208 and select an area of the "as is" APM that the user feels needs improvement from, for example, a cost, schedule, or efficiency standpoint. In the present disclosure, such problem areas are referred to as "challenges," and can relate to, for example, certain aspects of aircraft maintenance, flight schedule reliability, pilot log book entries, etc.

After selecting a challenge, the user can select an "event" in block 210 that is otherwise associated with the selected challenge. In this embodiment, the term "event" refers to a particular operational circumstance to which the "as is" APM responds. For example, a fuel indicator malfunction is an event that is associated with the challenge of maintaining aircraft schedule reliability.

After the user has selected a challenge and one or more corresponding events, an "as is" event model can be displayed for viewing by the user. An example of an "as is" event model is described in greater detail below with reference to FIG. 10. In one aspect of this embodiment, the "as is" event model can be a portion of the overall "as is" APM that graphically illustrates the sequence of functions that must be executed by the portion of the "as is" APM to respond to the selected event. That is, the "as is" event model provides a graphical simulation of the event-specific path for responding to the selected event. Viewing the "as is" event model allows the user to gain a better understanding of the various functional groups that have to respond to a particular event in the "as is" APM. Further, by viewing this model, the user is able to identify where inefficient processes exist leading to increased time or cost impacts to operations. With this information in mind, the user can proceed to block 214 and select one or more products and/or services that, when implemented, enable the APM to respond to the particular event in a more efficient and less costly manner. After the various products and/or services have been selected, the user can proceed to block 216 and view a "what if" event model.

In a further aspect of this embodiment, the "what if" event model is similar to the "as is" event model in that it reproduces a particular portion of the overall APM. However, the "what if" event model differs from the "as is event model in that the "what if" event model graphically and/or numerically illustrates the greater efficiencies and more streamlined operations that result from implementing the selected products and/or services. Accordingly, one benefit of this embodiment is that it can quickly and easily provide a visual description of the benefits that implementing a particular product and/or service can have to the operations of an airline or other major enterprise.

If the user wishes to select other products and/or services and view the effects of implementing them, the user can do so in decision block 218 by returning to block 214 and proceeding as described above. Alternatively, the user can proceed to block 220 and select various forms of comparative analyses and/or other forms of output that illustrate the operational impact and value of implementing the "what if" model. Such comparative analyses can include, for example, a comparison of the relative costs between the "as is" event model and the "what if" event model. Other forms of comparative analyses can include a graphical display of the percent increase in on time schedule performance for the airline that results from implementing the selected products and/or services. Yet other forms of comparative analyses can be selected by the user including cash flow analyses, etc. In addition to the foregoing, the user can also request various forms of output in the form of data reports, executive summaries, business cases, business proposals, etc. These and other aspects of the present invention are described in greater detail below with reference to the corresponding display pages.

Figure 3:
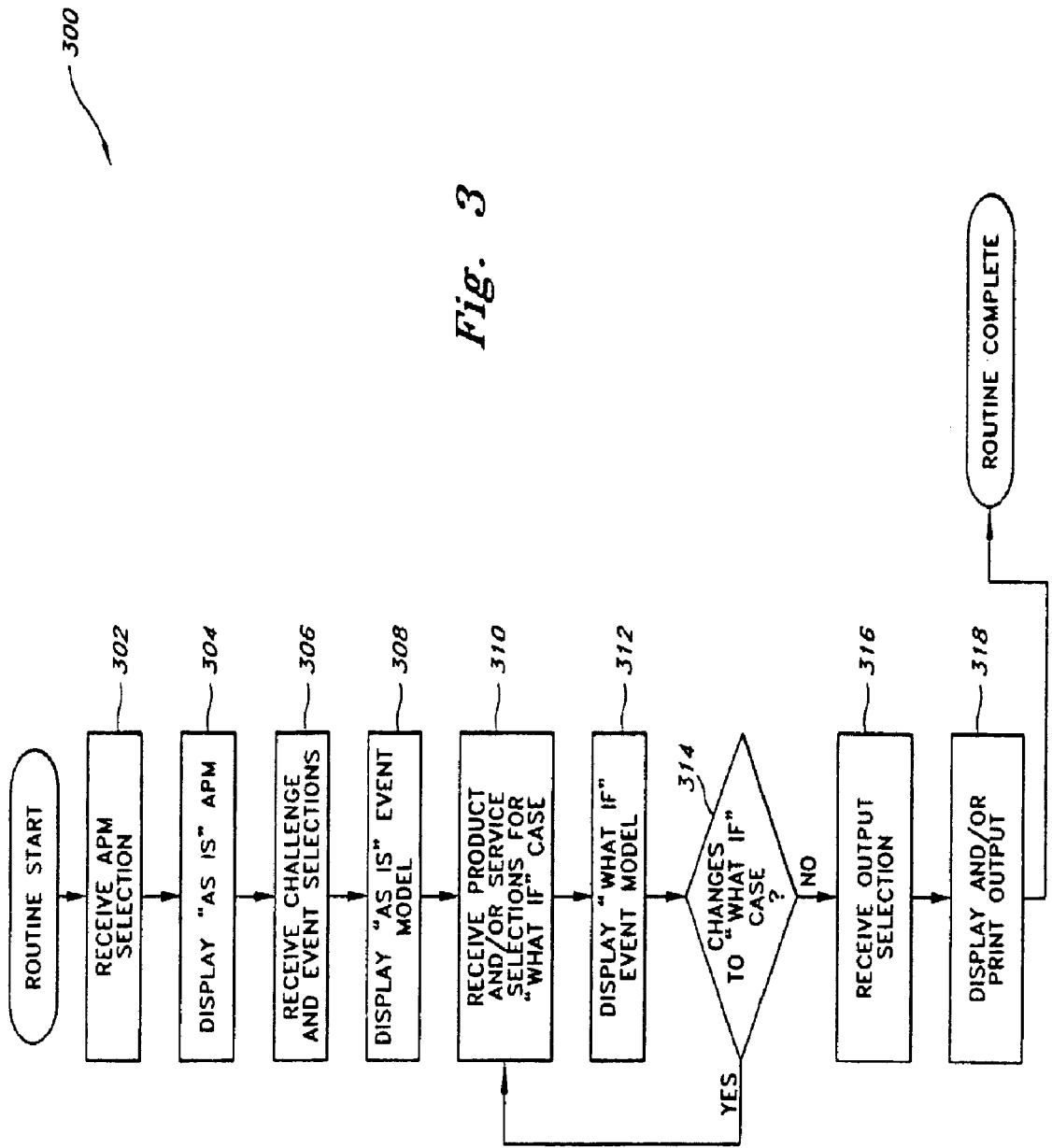
FIG. 3 is a flow diagram illustrating a routine for displaying a "what if" event model and providing various forms of output relating to the event model.

FIG. 3 is a flow diagram illustrating a routine 300 for displaying a "what if" event model and providing various forms of output relating to the event model in accordance with an embodiment of the invention. In one aspect of this embodiment, the routine 300 can be performed by one of the user computers 102 described above with reference to FIG. 1 in accordance with computer executable instructions stored on a corresponding computer-readable medium. In other embodiments, the routine 300 can be implemented by other computational devices.

The routine 300 begins in block 302 by receiving an "as is" APM selection from a user. As set forth above, in one embodiment, the "as is" APM is an organized collection of graphical and numerical data that describes the current functions, processes, information elements, and other parts of a particular airline.

In block 304, the routine 300 displays the "as is" APM in response to the selection. In block 306, the routine 300 receives challenge and event selections from the user. In block 308, the routine 300 displays an "as is" event model in response to receiving the challenge and event selections.

After displaying the "as is" event model, in block 310 the routine 300 can receive product and/or service selections from the user corresponding to a "what if" case. In response to receiving these selections, the routine 300 can display a corresponding "what if" event model in block 312. In decision block 314, the routine 300 checks for any changes to the "what if" case from the user. If there are any changes, the routine 300 returns to block 310 and updates the "what if" case to reflect the changes (e.g., additions and/or deletions of products and services).

In block 316, the routine 300 receives output selections from the user. As described in greater detail below, these output selections can include requests for various forms of textual and/or graphical output including cost comparisons, time comparisons, and other forms of analyses that compare the "as is" case to the "what if" case. Such output can further include printouts of various reports such as executive summaries, business cases, and/or proposals. In block 318, the routine 300 displays and/or prints the requested output before ending.

Figure 4:
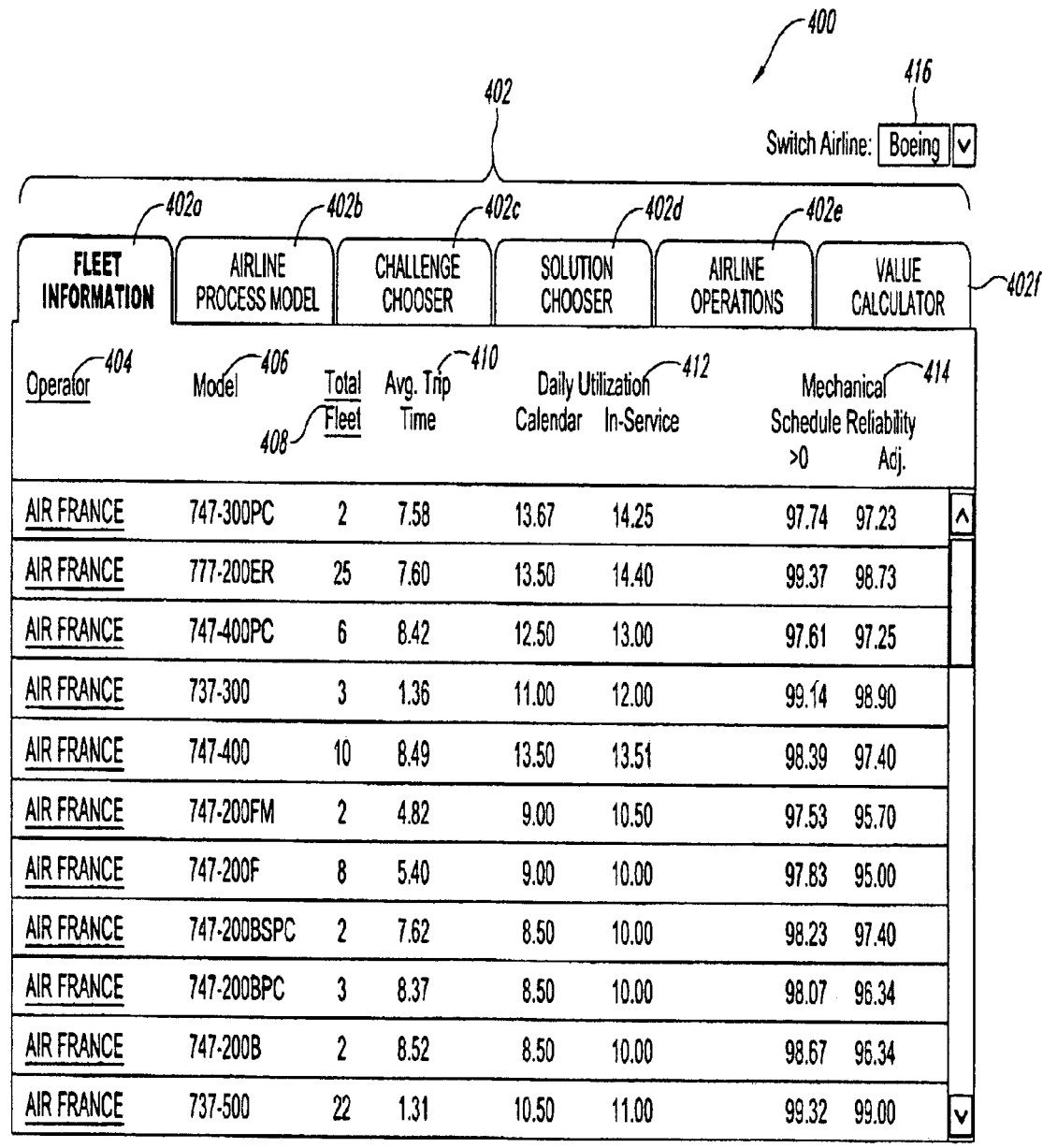
FIG. 4 is a schematic diagram of a display page presenting aircraft fleet information.

FIG. 4 is a schematic diagram of a display page 400 for presenting aircraft fleet information in accordance with an embodiment of the invention. The fleet information relates to the particular airline identified in a column 404. The information can include, for example, the particular aircraft models in the fleet, as identified in column 406, and the total number of each model, as shown in column 408. Further, the average trip time for each model can be shown in column 410, the daily utilization time can be shown in column 412, and the mechanical schedule reliability can be shown in column 414. The display page 400 can further include an airline drop down menu 416. The drop down menu 416 can include a list of the airlines from which the user can select. By selecting one of the listed airlines, the corresponding fleet information for that airline is displayed on a corresponding version of the display page 400.

In one aspect of this embodiment, the information presented on the display page 400 can be used to generate various portions of the "as is" and "what if" event case comparisons described in greater detail below. Although particular types of information are illustrated in FIG. 4 by way of example, in other embodiments, the display page 400 and extensions thereof can include other types of information. Like many of the display pages described below, the display page 400 can include a plurality of page tabs 402 (identified individually as page tabs 402a-f) arranged along an upper portion of the display page 400. By selecting one of the tabs 402, the user can bring up a corresponding display page containing the information and/or functionality identified by the tab. For example, the display page 500 discussed below with reference to FIG. 5A can be displayed in response to the user selecting the APM tab 402b.

Figure 5A:
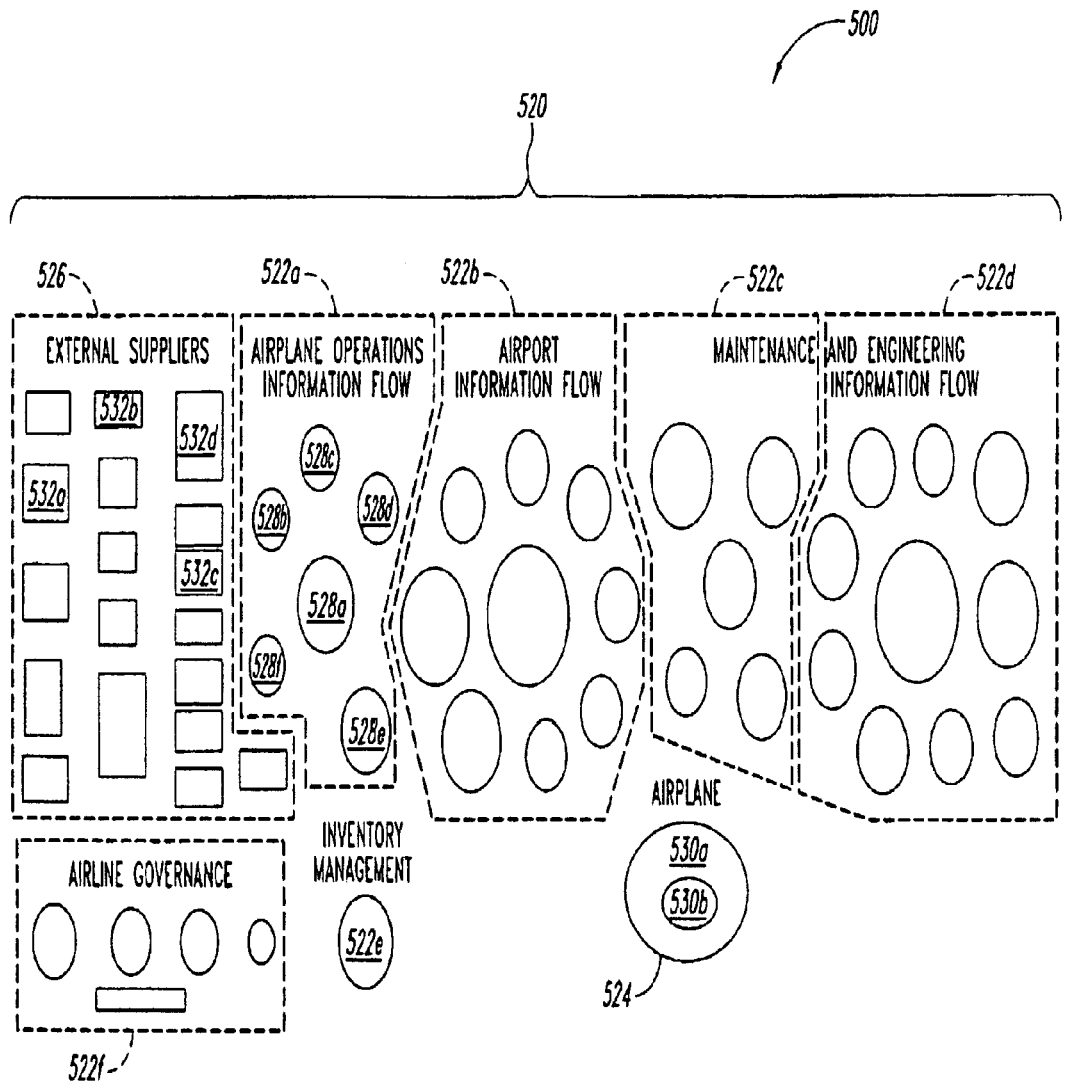
FIG. 5A is a schematic diagram of a display page illustrating an airline process model.
Figure 5B:
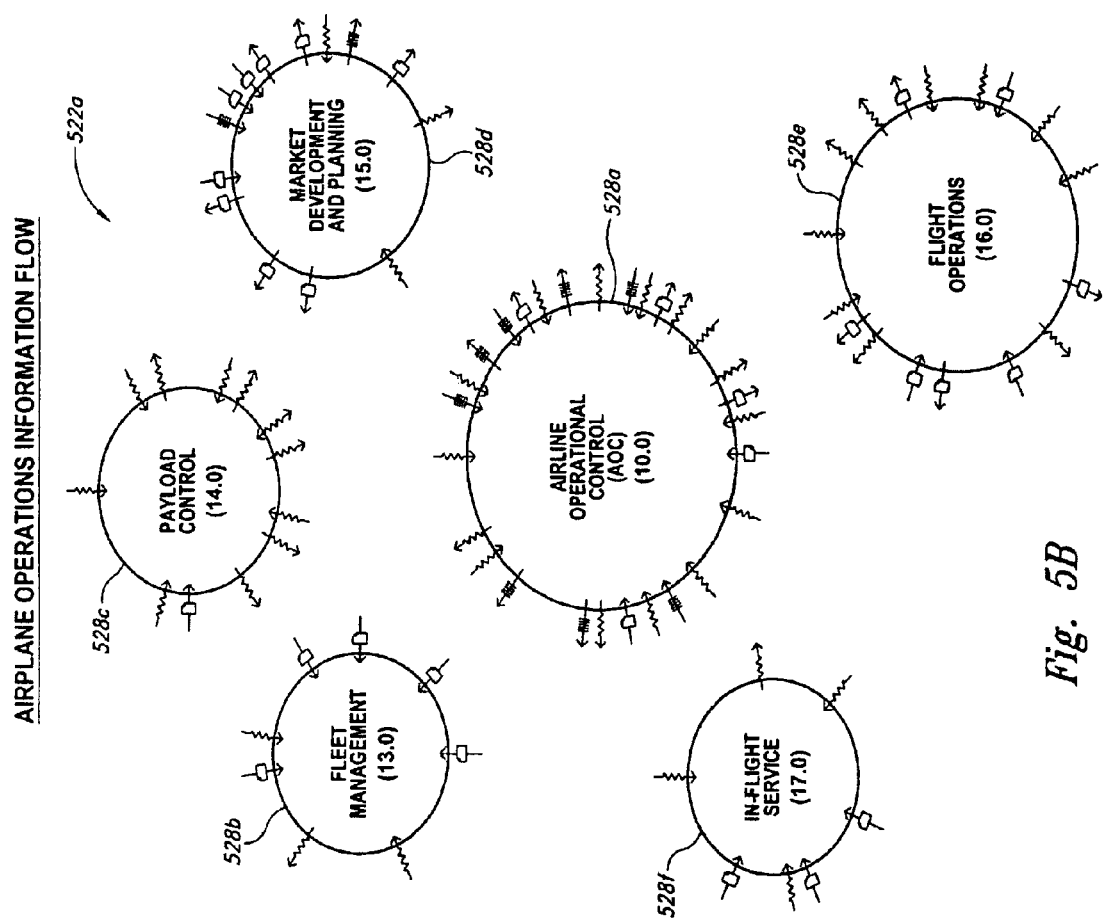
FIGS. 5B-I illustrate enlarged portions of the airline process model of FIG. 5A.
Figure 5C:
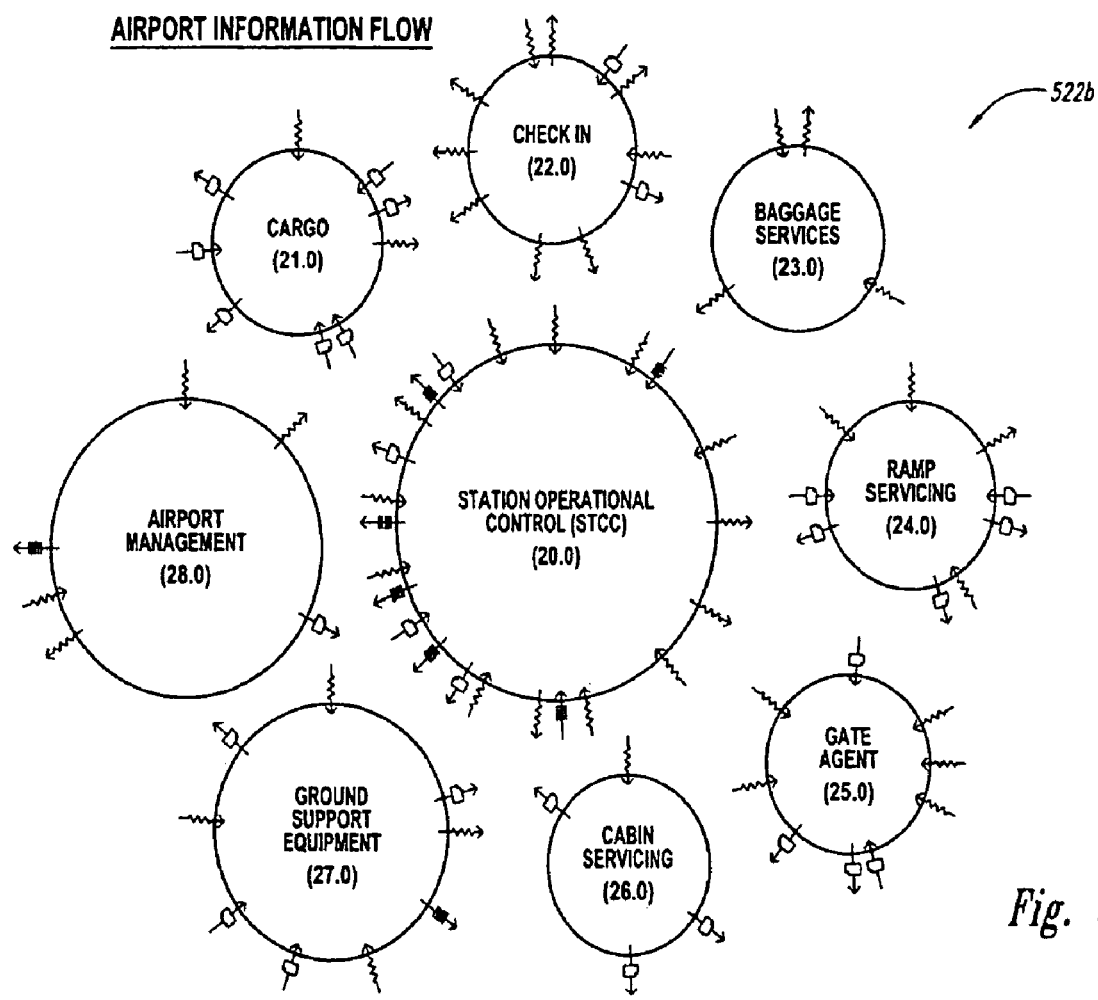
Figure 5D:
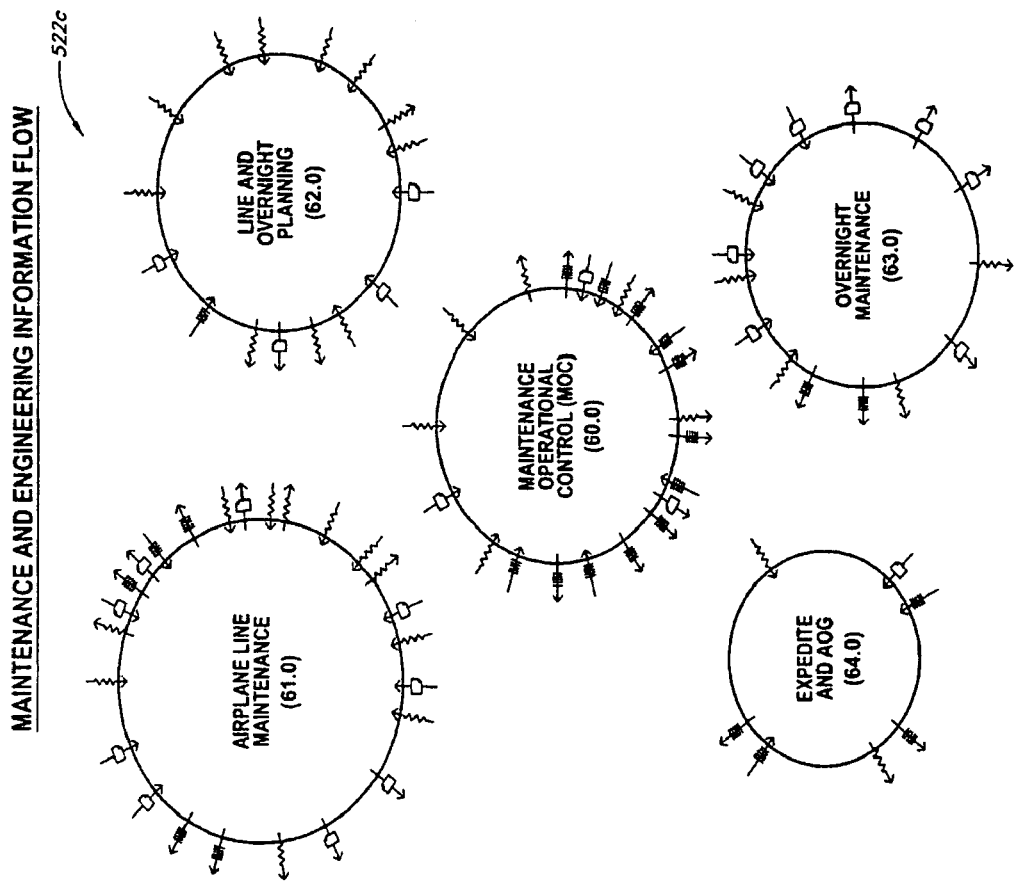
Figure 5E:
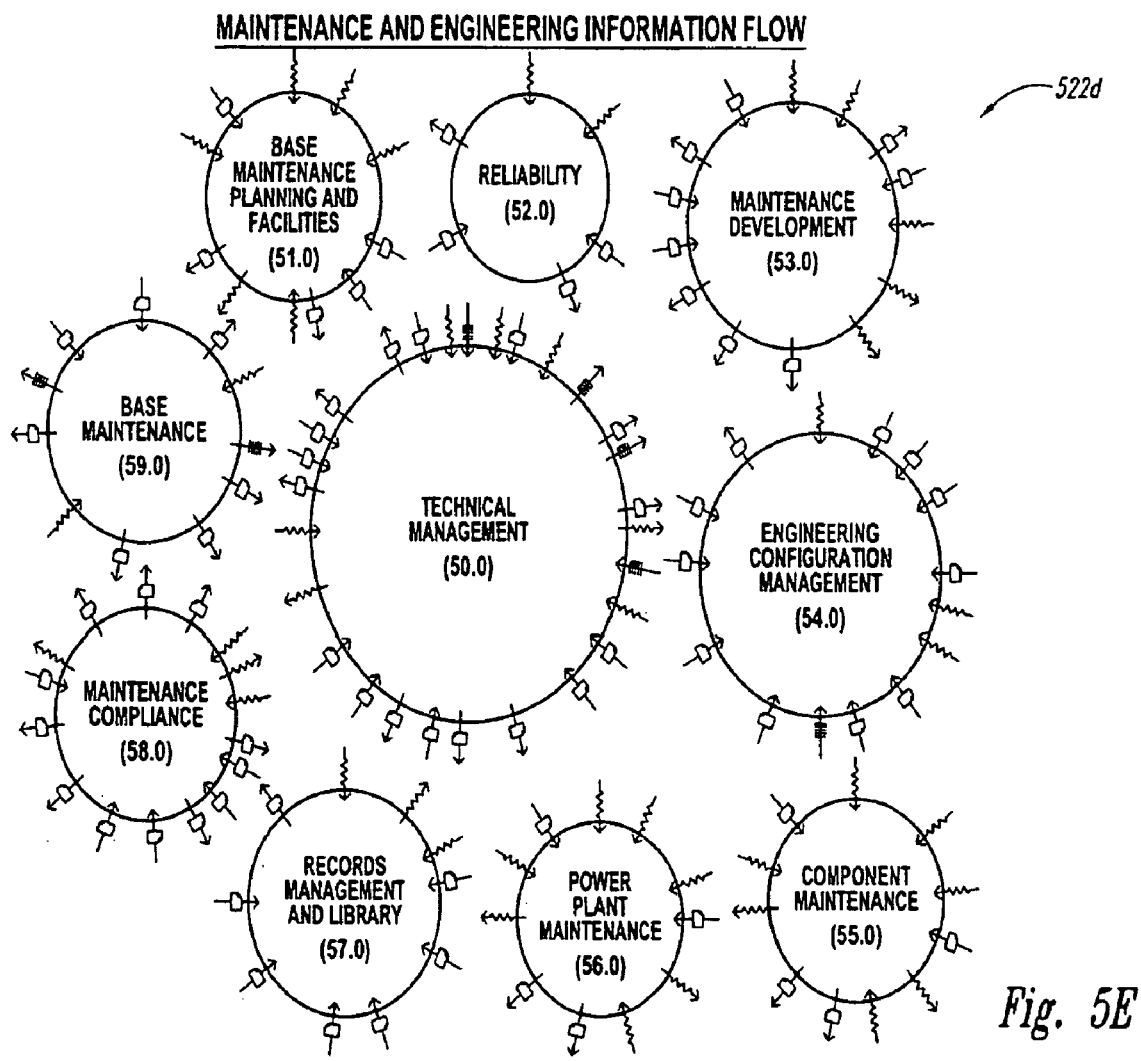
Figure 5F:
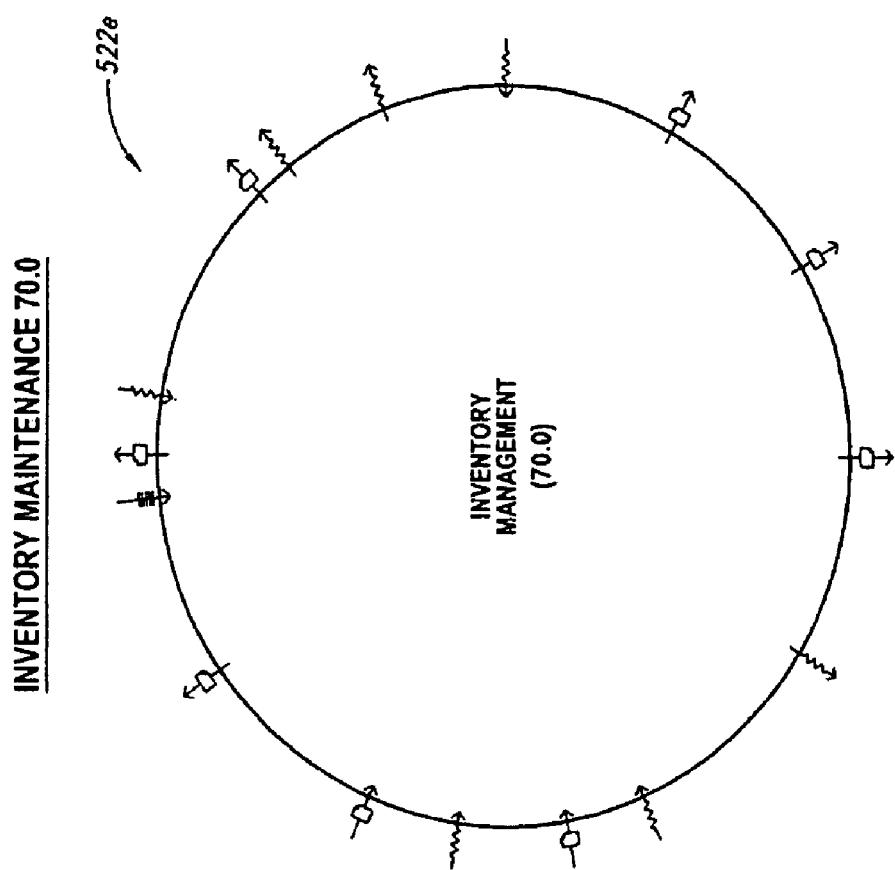

FIG. 5A is a schematic diagram of a display page 500 illustrating an airline process model 520 ("APM" 520) configured in accordance with an embodiment of the invention, and FIGS. 5B-H present enlarged portions of the APM 520 in more detail than FIG. 5A. The APM 520 is an organized data structure that graphically illustrates the various processes performed by different functional groups in a selected airline. In the illustrated embodiment, the different functional groups are represented by circles and ellipses, and are divided among different functional areas. The different functional areas can include Airline Operations 522a, Airport Information 522b, Aircraft Maintenance and Engineering 522c, Inventory Management 522d, and Airline Governance 522e. In other embodiments, the APM 520 can include other functional areas.

By way of example, the Airline Operations functional area 522a can include functional groups responsible for Airline Operational Control 528a, Fleet Management 528b, Payload Control 528c, Market Development and Planning 528d, Flight Operations 528e, and In-flight Service 528f. Each of the foregoing functional groups 528 can perform a wide variety of different functions that are related to the overall function area. These individual functions are not listed in FIG. 5 because of size constraints. By way of example, however, the Airline Operational Control functional group 528a can perform functions related to flight scheduling, equipment scheduling, dispatch/flight operations, cabin crew tracking and scheduling, customer service, operation analysis, etc. The payload control functional group 528c can perform functions related to, for example, airline flight schedules, cargo sales, passenger sales, etc. The flight operations functional group 528e can perform functions related to, for example, flight crew rosters, navigational data and charts, fuel on board, airplane performance data, etc.

In addition to the functional areas described above, the APM 520 can further include an Airplane Functional area 524 and an external supplier functional area 526. The Airplane Functional area 524 includes an airplane functional group 530a and a crew kit functional group 530b. The external supplier functional area 526 includes a plurality of functional groups represented by squares. These functional groups can include entities outside the airline that influence the day-to-day operations of the airline in some way. For example, in the illustrated embodiment, the external supplier functional area 526 can include outside functional groups such as air traffic control 532a, fuel suppliers 532b, customs and immigration 532c, government security agencies 532d, etc. In other embodiments, the external supplier functional area 526 can include other functional groups.

The architecture of the APM 520 described above is but one example of an airline process model configured in accordance with the present invention. Accordingly, in other embodiments, other airline process models configured in accordance with the present invention can include other arrangements of functional areas and/or functional groups. Further, in such embodiments, the functional groups can include other processes in addition to, or in place of, the processes included in the APM 520.

The foregoing description of the display page 500 provides a broad overview of the architecture of the APM 520. Additional details of the various functional areas included in the APM 520 are provided for reference in corresponding FIGS. 5B-5I. Some of the symbols illustrated in FIGS. 5B-5I are described below with reference to FIG. 6.

Figure 6:
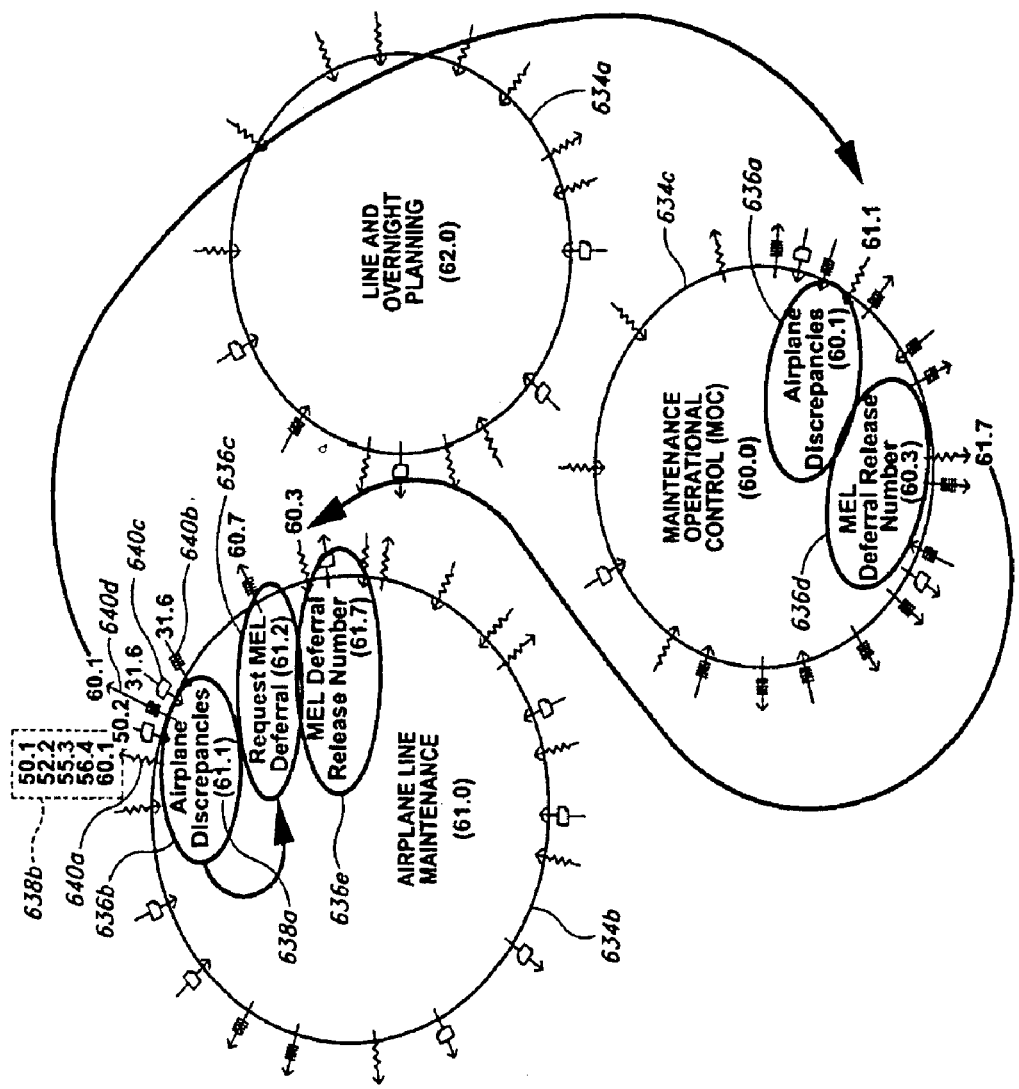
FIG. 6 is a schematic diagram of a display page illustrating an enlarged portion of the airline process model of FIG. 5 for the purpose of graphically illustrating how different functional groups in the model respond to challenges and events that occur in day-to-day operations.

FIG. 6 is a schematic diagram of a display page 600 illustrating an enlarged portion of the APM 520 of FIG. 5A. Specifically, the display page 600 illustrates the functional groups in the Aircraft Maintenance and Engineering functional area 522c that are responsible for Overnight Planning 634a, Airplane Line Maintenance 634b, and Maintenance Operational Control 634c. Each of the functional groups 634 includes a plurality of corresponding processes or functions. The Airplane Line Maintenance functional group 634b, for example, includes an Airplane Discrepancies function 636b and a request MEL (minimum equipment list) deferral function 636c. Further, the maintenance operational control functional group 634c includes, among others, an Airplane Discrepancies function 636a.

Each function in the different functional groups includes a function identifier 638. For example, the Airplane Discrepancies function 636b includes a first function identifier 638a (i.e., "61.1"). The function identifiers 638 are used to designate the destinations of various types of information (identified individually as information flows 640a-d) that flow between the different functional groups. Each individual information flow 640 has a particular graphical representation that represents the particular type of information that is exchanged. Referring to the Airplane Discrepancies function 636b, for example, the first information flow 640a is represented by a first line type (e.g., a jagged line) to illustrate that digital information is sent from the Airplane Discrepancies function 636b. Because the arrow on the jagged line points away from the Airplane Discrepancies function 636b, this indicates that the digital information is provided from the Airplane Discrepancies function 636b to the other functions identified by the second function identifiers 638b.

Figure 5G:
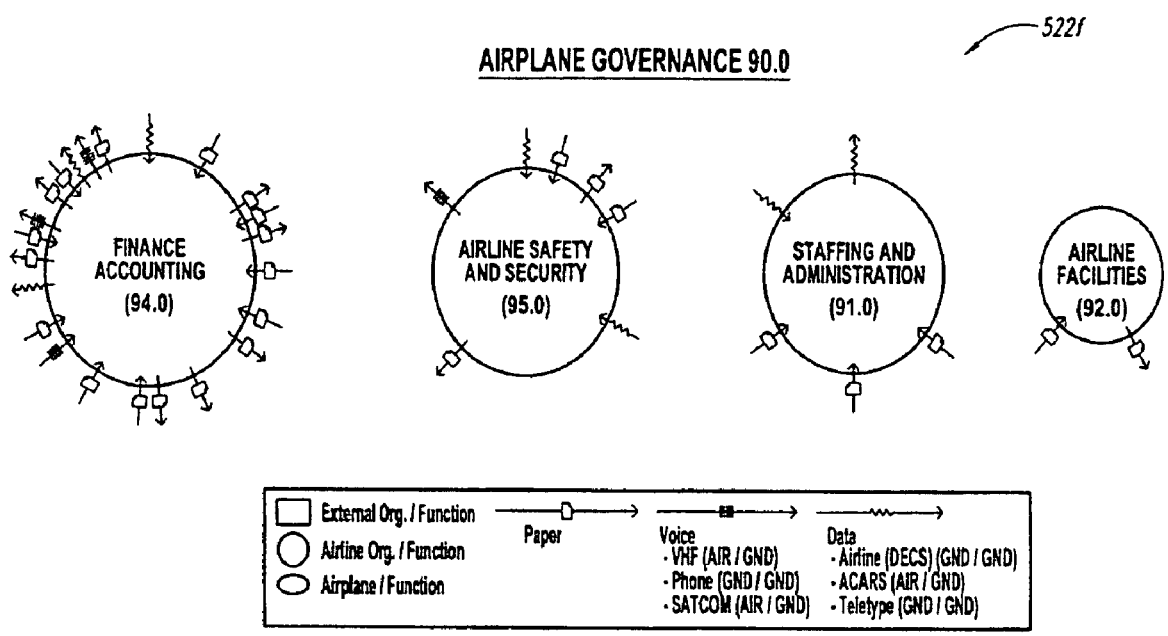
Figure 5H:
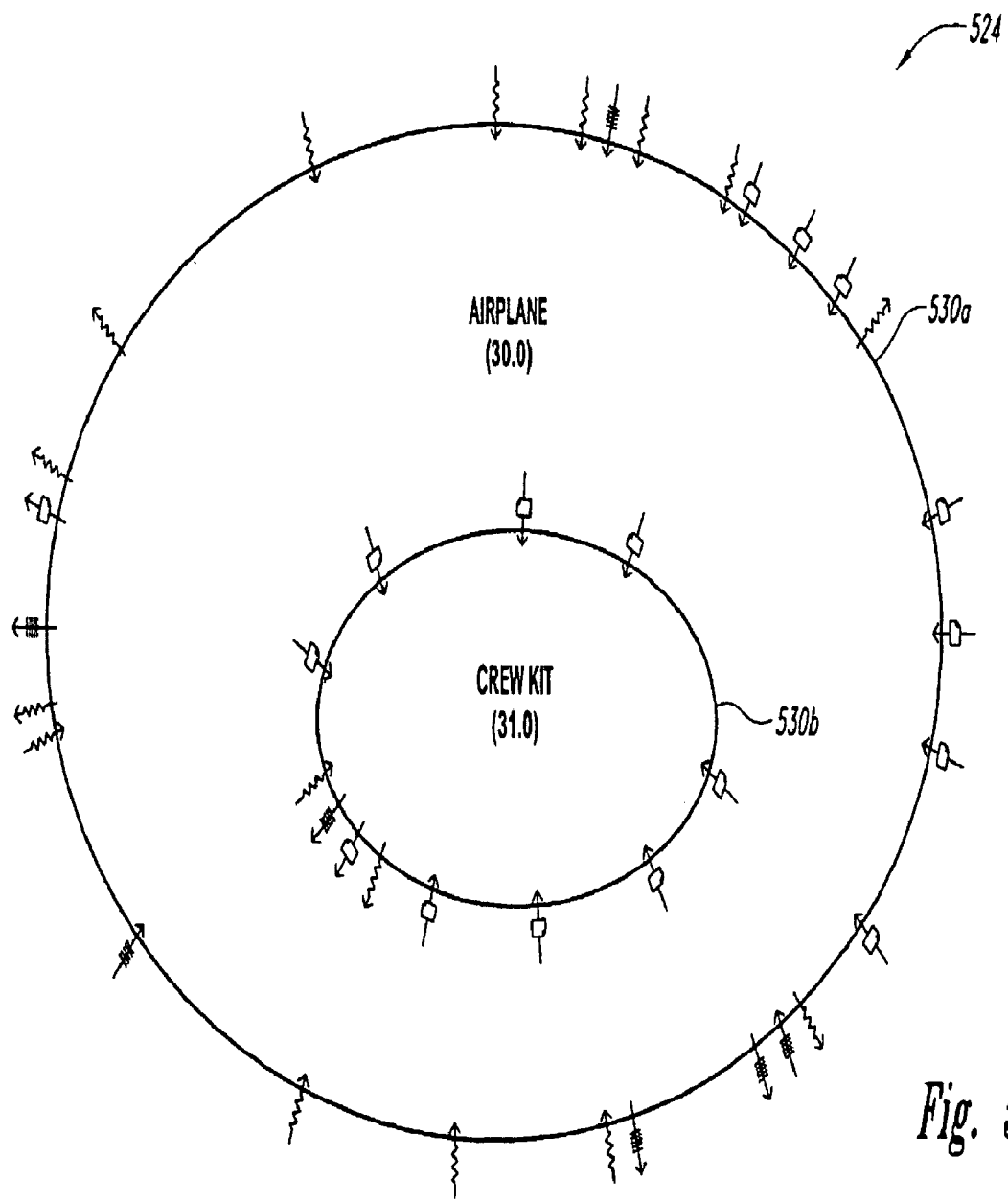
Figure 5I:
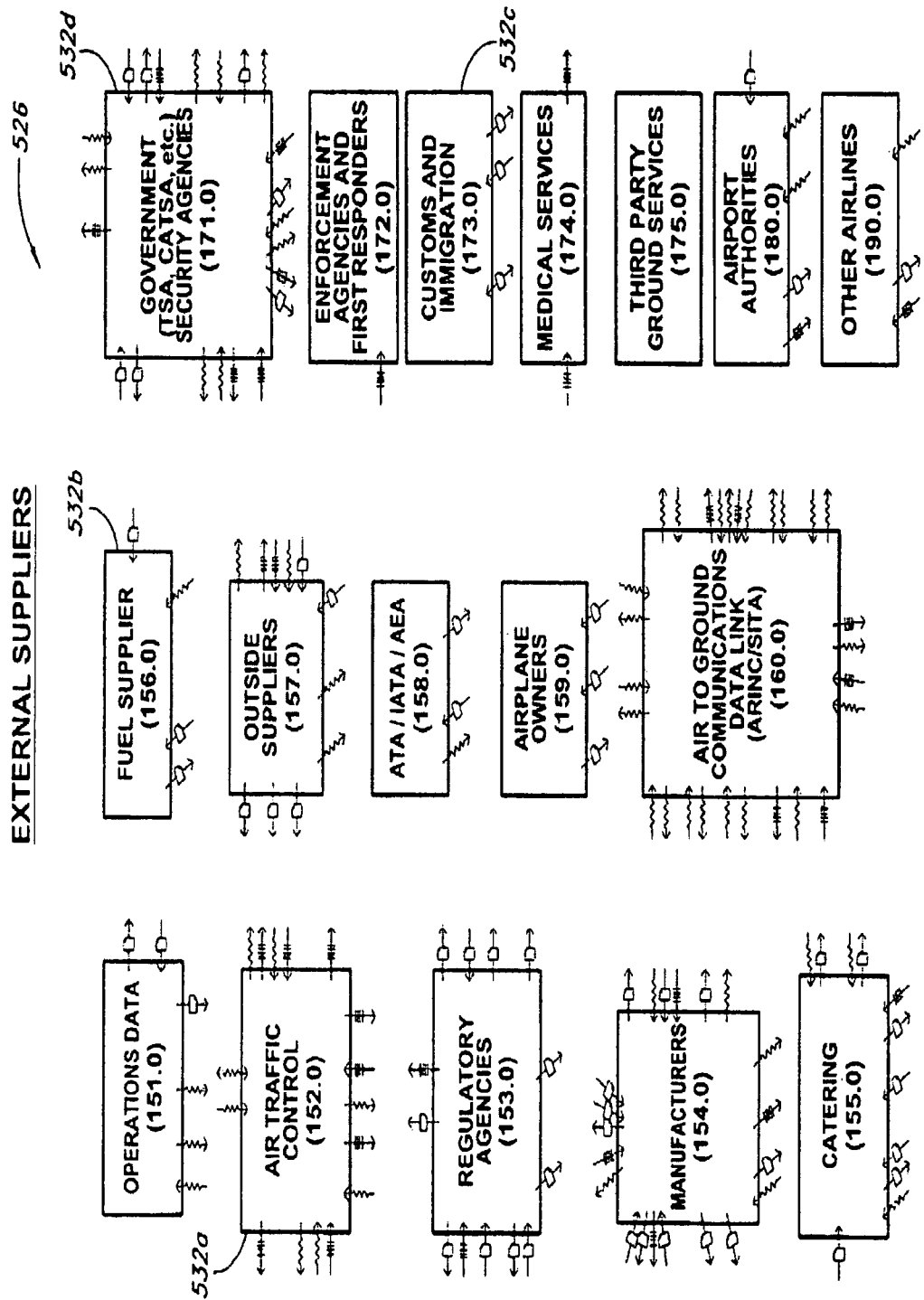

The broken line and the associated arrow of the second information flow 640b indicates that voice data is transmitted to the Airplane Discrepancies function 636b from the function having the identifier 31.6 (for reference, the function identifier 31.6 corresponds to a logbook entries function included in the crew kit functional group 530b illustrated in FIGS. 5A and 5G). The page symbol illustrated of the third information flow 640c indicates that paper copies of information are transmitted to the Airplane Discrepancies function 636b from the 31.6 function. Further, the broken line and the outwardly pointing arrow of the fourth information flow 640d indicates that the Airplane Discrepancies function 636b transmits voice data to the 60.1 function (i.e., the Airplane Discrepancies function 636a of the maintenance operational control functional group 634c).

As mentioned above, the APM 520 (FIG. 5A) can be used to graphically illustrate how the different functional groups respond to challenges and events that occur in the day-to-day operations of the airline. The following example illustrates one way the portion of the APM 520 shown in FIG. 6 can be used in this manner. In this example, an airplane discrepancy occurs and a line mechanic troubleshoots the discrepancy as part of the Airplane Discrepancies function 636b. The line mechanic then determines if an MEL deferral is the appropriate response in a Request MEL Deferral function 636c. Next, the line mechanic notifies the Airplane Discrepancy Function 636a via voice data that a discrepancy was reported. The MEL Deferral Release Number function 636d of the Maintenance Operational Control functional group 634c then sends the line mechanic an MEL deferral number via digital data. The line mechanic receives the digital data in a corresponding MEL Deferral Release Number function 636e of the Airplane Line Maintenance functional group 634. The line mechanic then walks the MEL deferral number to the airplane as paper data traveling from the MEL deferral release number function 636e to the log book entry function of the Crew Kit functional group 530b (FIG. 5G).

As the foregoing example illustrates, the APM embodiment described in FIG. 6 provides a useful graphical tool for visualizing the various processes that must be carried out by the airline to respond to a particular problem or event. As described in greater detail below, this feature of the APM can also be used to identify inefficient processes that can be improved by implementing various products and services. Further, this feature is also useful for visualizing and contrasting how the products and services, if implemented, can improve the existing "as is" processes.

Figure 7:
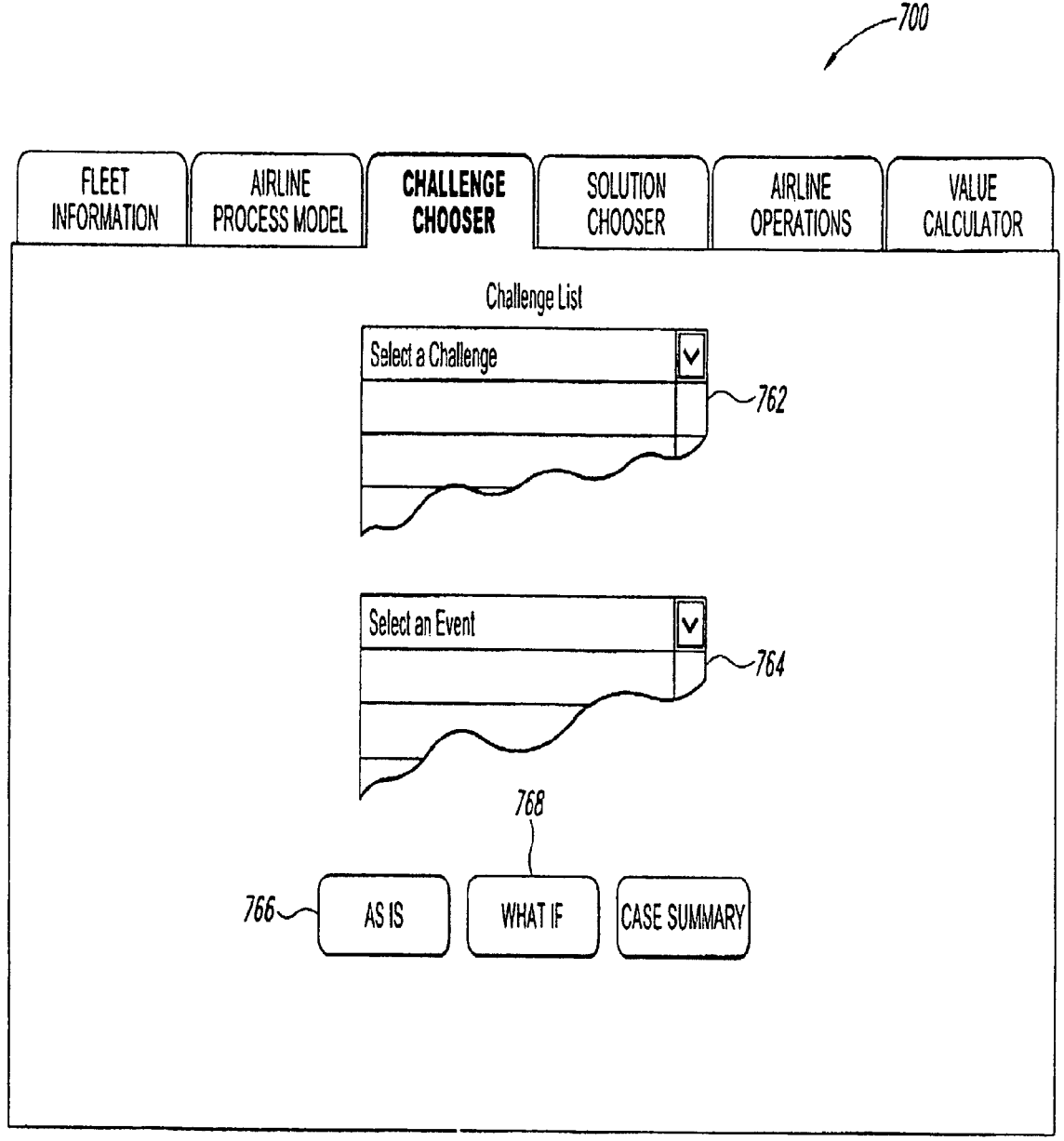
FIG. 7 is a schematic diagram of a display page for selecting a "challenge" and an associated "event".

FIG. 7 is a schematic diagram of a display page 700 for selecting a "challenge" and an associated "event" in accordance with an embodiment of the invention. The display page 700 can include a challenge drop-down menu 762 and an event drop-down menu 764. The user can begin by selecting a challenge from the challenge drop-down menu 762. As explained above with reference to FIG. 2, a "challenge" is an operational problem facing the airline that is associated with one or more related "events." Examples of challenges include "delays and cancellations," "maintenance program compliance," "crew productivity," and "air traffic routing." Next, the user can select an associated event from the event drop-down menu 764. An event is an airline operational circumstance to which the APM 520 (FIG. 5A) responds, such as "fuel quantity indicator failure." After making these selections, the user can select an "as is" button 766 to bring up an "as is" event model that graphically illustrates how the relevant portion of the APM 520 responds to the selected event.

Figure 8:
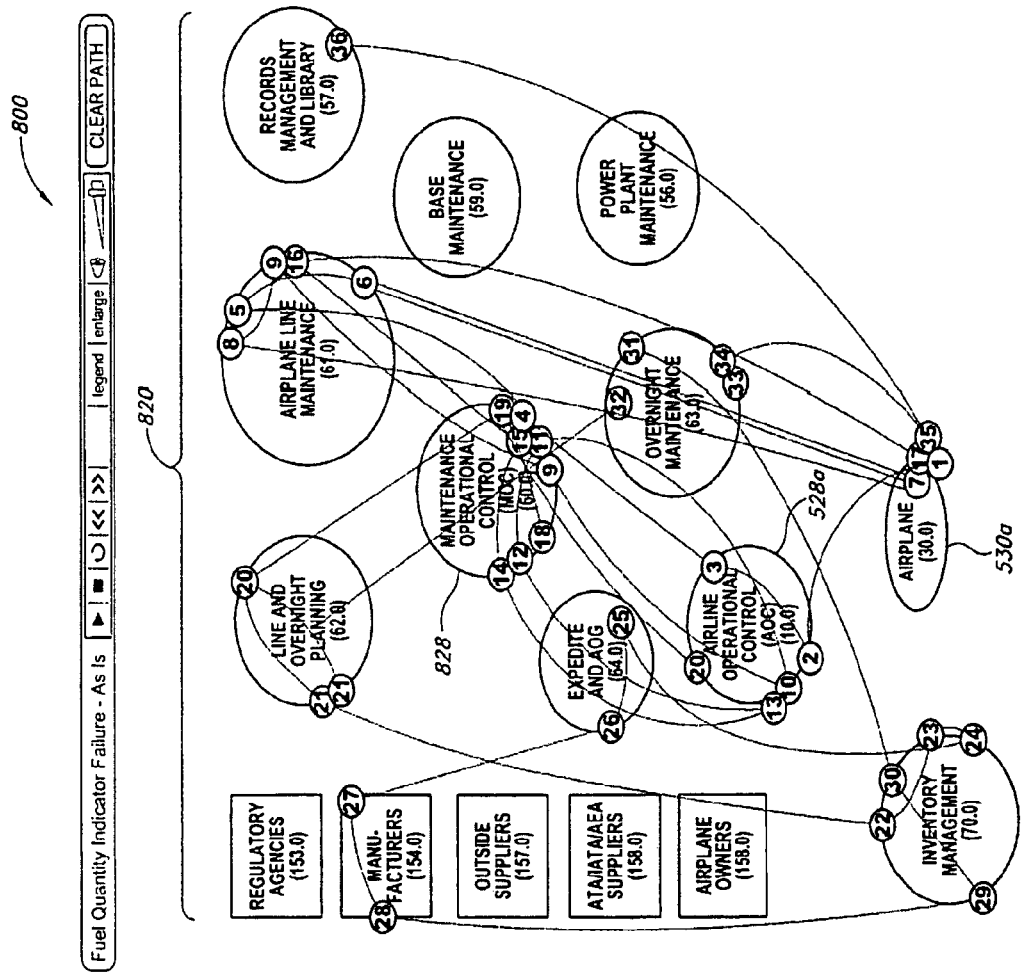
FIG. 8 is a schematic diagram of a display page that graphically illustrates an "as is" event model.

FIG. 8 is a schematic diagram of a display page 800 illustrating an "as is" event model 820 configured in accordance with an embodiment of the invention. The "as is" event model 820 graphically illustrates how the relevant functional groups in the APM 520 (FIG. 5A) respond to the fuel quantity indicator failure event selected via the display page 700 of FIG. 7. In the illustrated example, the relevant functional groups include the airplane functional group 530a, the Airline Operational Control functional group 528a, and a maintenance operational control functional group 828, among others. Each of these functional groups performs functions in response to the fuel quantity indicator failure. These individual functions are identified by numbers that correspond to the sequence in which the functions are performed. For example, the first step in response to the fuel quantity indicator failure (identified by the number 1) is performed by the Airplane functional group 530a when the pilot report is recorded (via voice transmission) in the log book; the second step (identified by number 2) is performed by the Airline Operational Control functional group 528a when the pilot reports the problem via another voice transmission; and so on from there.

Figure 9:
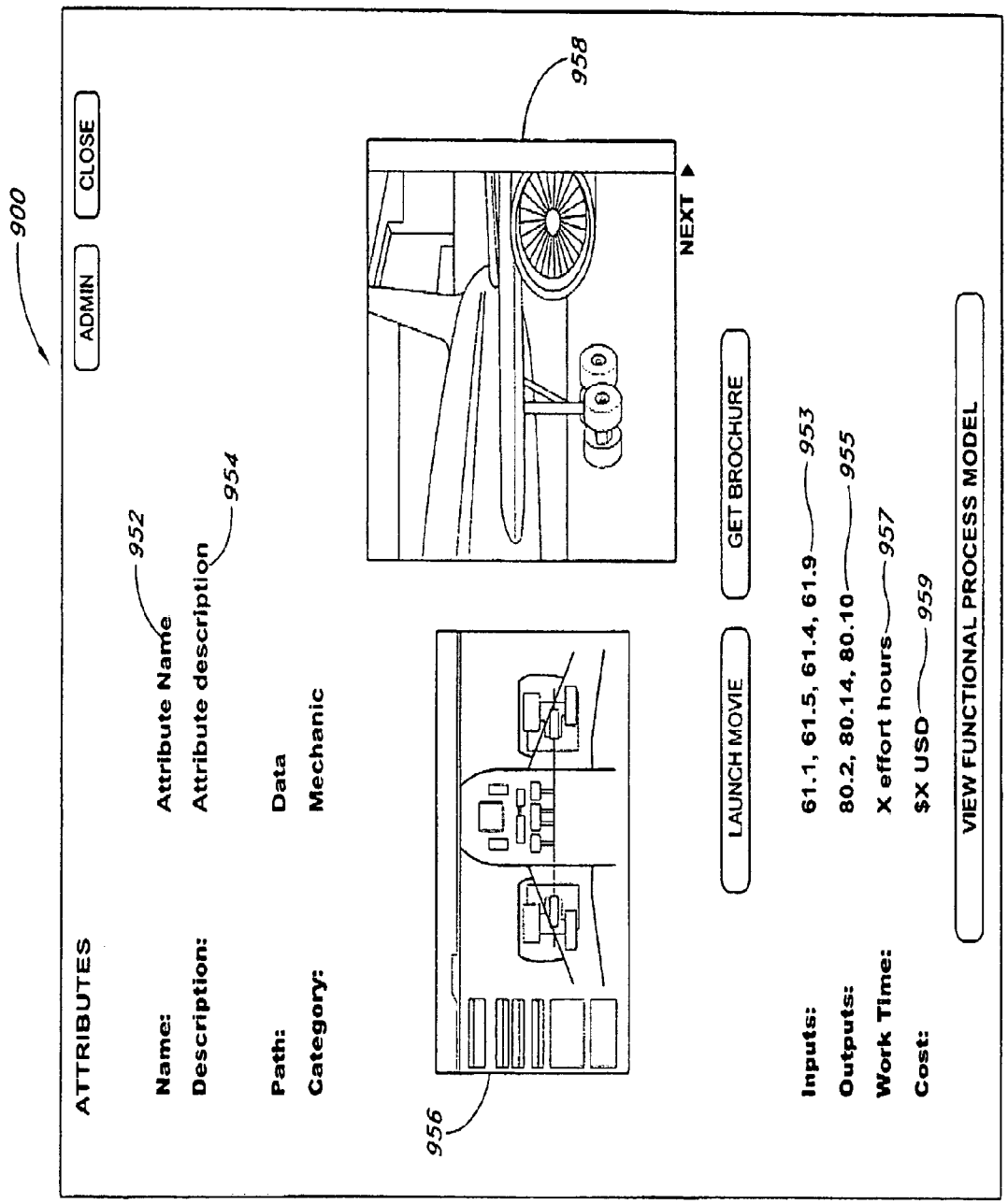
FIG. 9 is schematic diagram of a display page for reviewing and/or editing attributes of a particular function.

Each of the functional steps noted by a number in FIG. 8 includes attributes that describe the function performed. In one aspect of this embodiment, the user can review and/or edit these attributes with a display page 900 schematically illustrated in FIG. 9. In one embodiment, the user can bring up the display page 900 for a particular function by simply clicking on the number that corresponds to that function on the "as is" event model 820. Referring to FIG. 9, the display page 900 can include a number of data fields with which the user can alter the various attributes associated with the selected function. For example, the attributes display page 900 includes a name field 952 and an attribute description field 954. The attribute display page 900 also includes a movie feature 956 and a brochure feature 958. The movie feature 956 allows the user to view a movie describing aspects of the particular function. Similarly, the brochure feature 958 allows the user to view and/or order a hard copy of a brochure describing the particular function.

In addition to the foregoing, the attribute display page 900 also includes an input field 953, an output field 955, a work time field 957, and a cost field 959. The input field 953 displays the current set of functions that provide input to the selected function. Similarly, the output field 955 lists the current set of functions that receive output from the selected function. The work time field 957 shows the number of man-hours required to perform the function, and the cost field 959 shows the cost in dollars of performing the function. By editing the attribute display page 900, the user can automatically modify the corresponding airline process model as required to accurately reflect the actual processes performed by the airline.

Returning to FIG. 8, the "as is" event model 820 assumes that no new products or services have been implemented by the airline to facilitate the various operational processes and streamline how the airline responds to different challenges and events. As a result, one advantage of the "as is" event model 820 is that it allows the airline operator to easily see the inefficiencies that may exist in Airline Operations and the relative need for products and services that can streamline these operations. If the airline operator is interested in seeing how various products and services can improve the situation, the user can do so by returning to the display page 700 described above with reference to FIG. 7 and selecting a "what if" button 868 (see FIG. 7).

Figure 10:
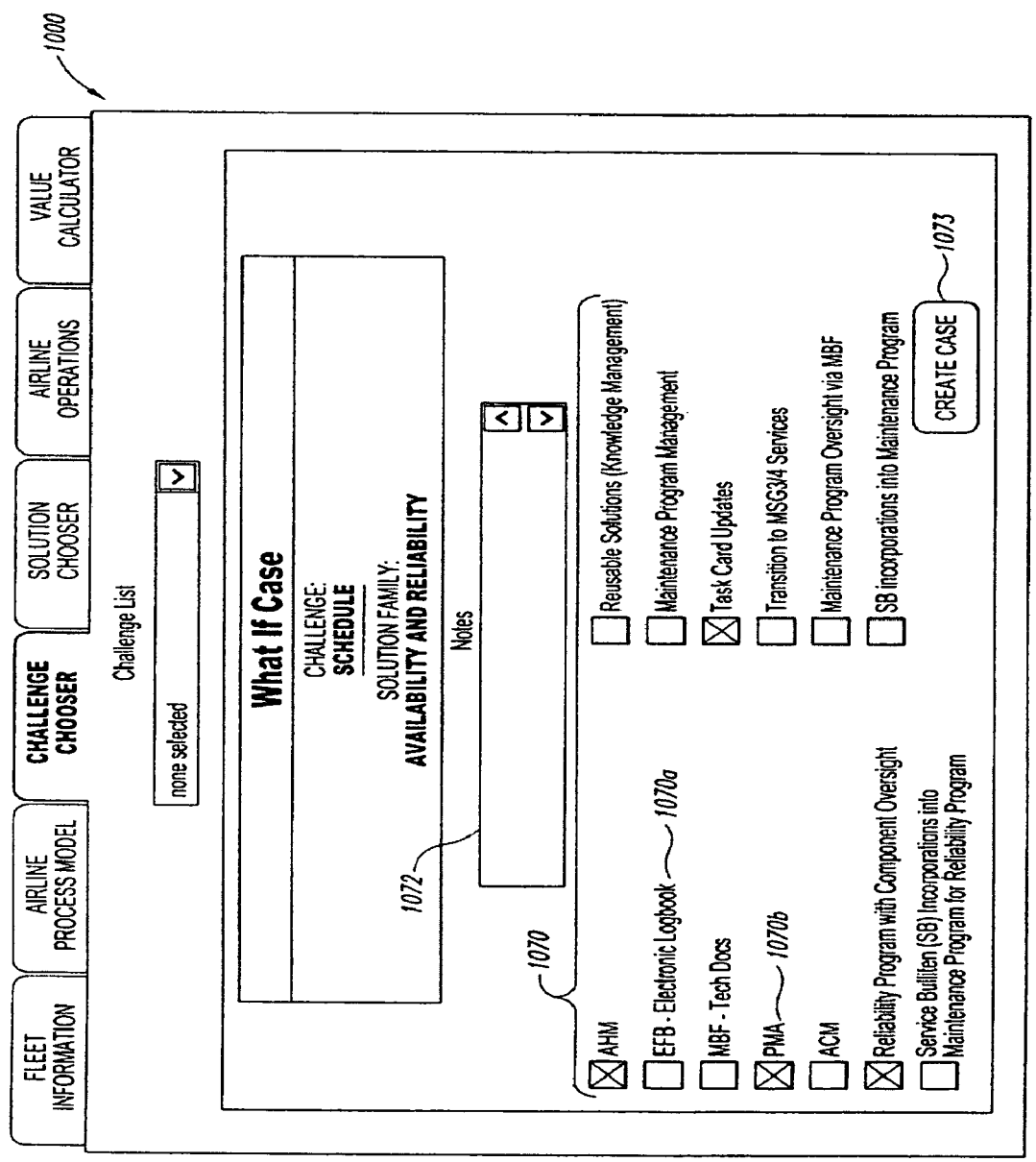
FIG. 10 is a schematic diagram of a display page for selecting a "what if" case.

FIG. 10 is a schematic diagram of a display page 1000 for selecting a "what if" case in accordance with an embodiment. The display page 1000 includes a list of products and services 1070 from which the user can select. The products and services 1070 can include various software and database programs that automate and/or partially automate various processes carried out by the airline functional groups. For example, EFB-electronic log book 1070a is an Internet enabled log book that allows pilots to enter information about each flight electronically. PMA 1070b is a portable maintenance aid (e.g., a laptop-like device) that aircraft mechanics can carry with them onto the airplane when conducting maintenance, repairs, etc. This tool allows them to electronically access drawings, maintenance instructions, task cards, etc. without needing to get off the airplane and find hard copies of the information. As a result, this product can greatly increase the efficiency of the mechanic.

After reviewing the different products and services 1070, the user can select the products he or she wishes to implement by checking the adjacent box. In addition, the user can also enter notes about the particular "what if" case in an note field 1072. Once the user has selected the desired products and services and entered any relevant notes, the user can select a "create case" button 1073 to create a corresponding "what if" case.

FIG. 11 is a schematic diagram of a display page 1100 listing options for the user after a "what if" case has been created. The display page 1100 includes a case name field 1180 that identifies the particular "what if" case, and a products field 1182 that lists the selected products that the user wishes to implement in the "what if" case. In addition, the display page 1100 further includes a plurality of options buttons 1184. The option buttons include, for example, a run case option 1184a, a calculate option 1186b, an edit option 1184c, a delete option 1184d, and a create option 1184e. In this embodiment, selecting the run case option 1184a brings up a display page that graphically illustrates a "what if" event model that corresponds to the selected "what if" case. Selecting the edit option 1184c enables the user to edit the selected "what if" case. Selecting the delete option 1184d enables the user to delete the particular case, and selecting the create option 1184e enables the user to create a new "what if" case.

Figure 12:
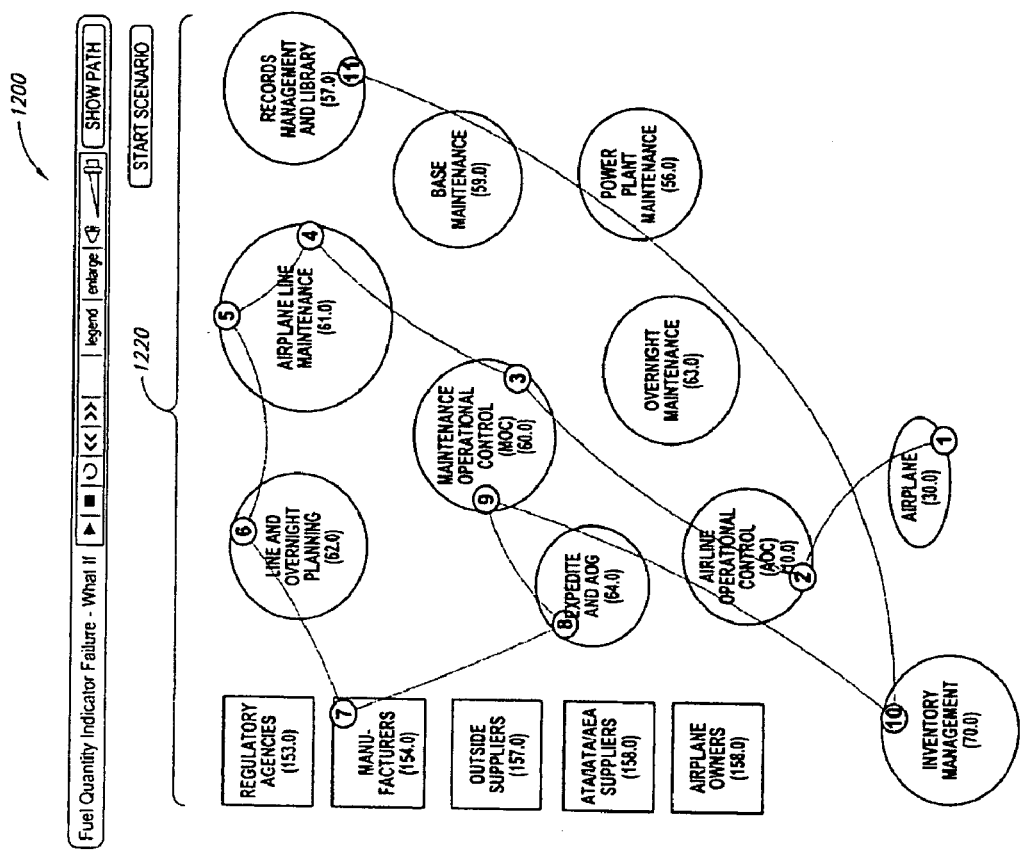
FIG. 12 is a schematic diagram of a display page that graphically illustrates a "what if" event model.

FIG. 12 is a schematic diagram of a display page 1200 graphically illustrating a "what if" event model 1220 corresponding to the "what if" case selected in FIG. 10. Comparing the "what if" event model 1220 to the baseline "as is" event model 820 (FIG. 8) clearly illustrates that implementation of the selected products and services would greatly reduce the number of functional steps the airline takes to respond to the particular challenge and event selected in FIG. 7 (i.e., the fuel quantity indicator failure). Accordingly, this tool can provide a sales agent with a means for quickly and convincingly demonstrating the benefits of implementing the different products and services to a prospective airline.

FIG. 13 is a schematic diagram of a display page 1300 that includes a list 1360 of existing "as is" and "what if" event cases configured in accordance with an embodiment of the invention. A case identifier for each case is provided in a case column 1302. User-entered notes for each case can also be provided under the corresponding case identifier. For "what if" cases, the products selected by the user are listed in an adjacent product column 1304. In one embodiment, the display page 1300 can be used as a reference for selecting from previously-run event cases. If the user wishes to view an event model corresponding to a particular case, the user can do so by selecting an appropriate select button 1306.

In addition to the graphical methods described above for comparing a "what if" event model that implements various products and services to an existing "as is" event model, the present invention also includes various methods and systems for presenting cost, schedule, and other data that illustrate the benefits of the selected products and services. For example, returning to FIG. 11, selecting the calc button 1084b can bring up a value calculator display page 1400 as schematically illustrated in FIG. 14.

Figure 14:
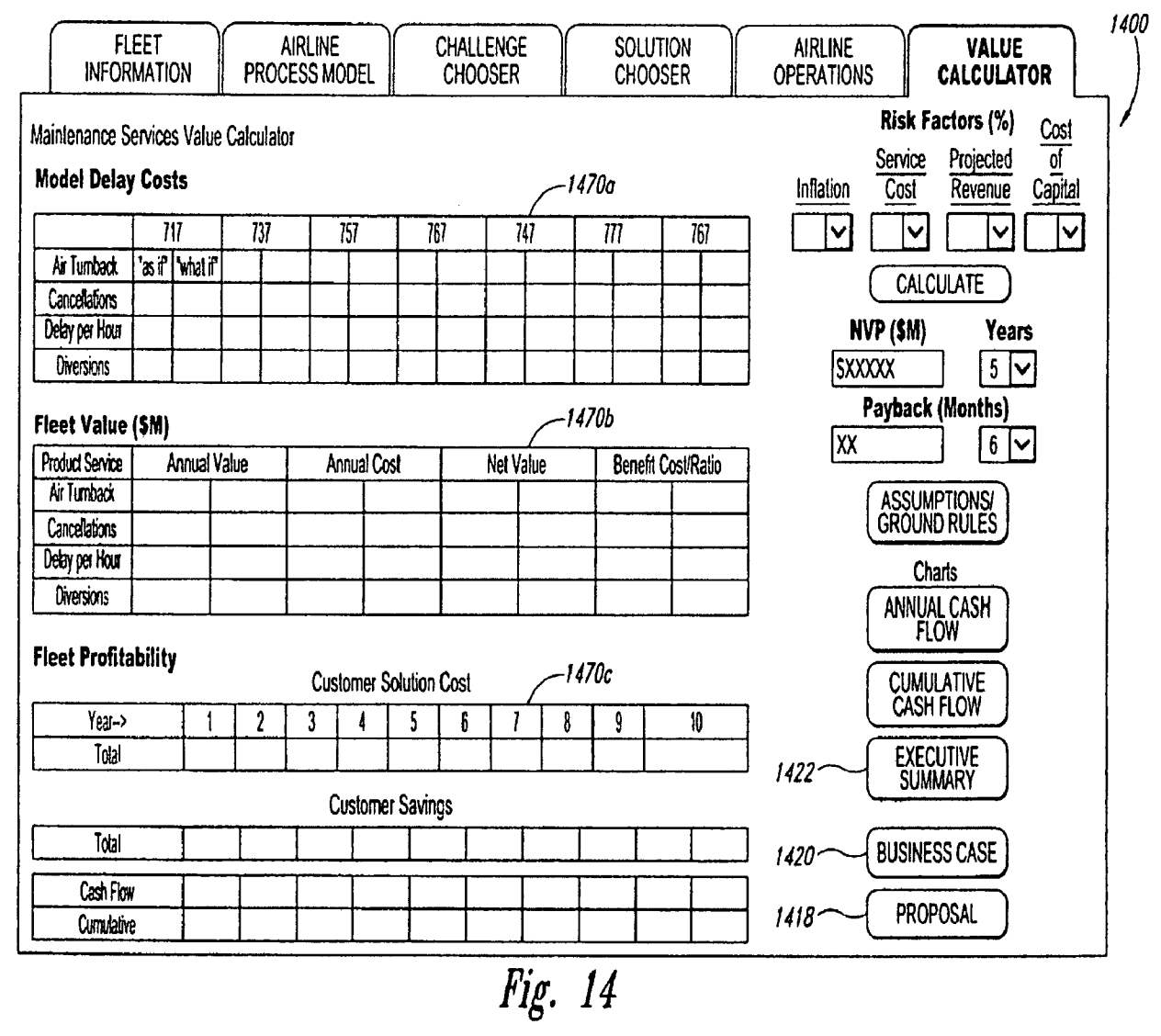

Referring to FIG. 14, the display page 1400 can include a number of spreadsheet fields 1470 (identified individually as spreadsheet fields 1470a-c) that compare costs associated with an "as is" model to costs associated with a corresponding "what if" model. For example, the model delay cost field 1470a can compare the costs of various delays in the "as is" model to the costs of delays in the "what if" model for different aircraft types. The fleet value field 1470b includes similar data corresponding to the annual value, the annual cost, the net value and the benefit cost/ratio for the delays. The fleet profitability field 1470c includes data that compares the year-by-year cost to the customer of the selected solutions (i.e., the selected products and services) vs. the year-by-year savings from implementing the solutions. As those of ordinary skill in the art will appreciate, the forgoing spreadsheets are merely representative of the various types of tools that can be included with the present invention to facilitate the comparison and/or analysis of the different product and/or services.

Figure 15:
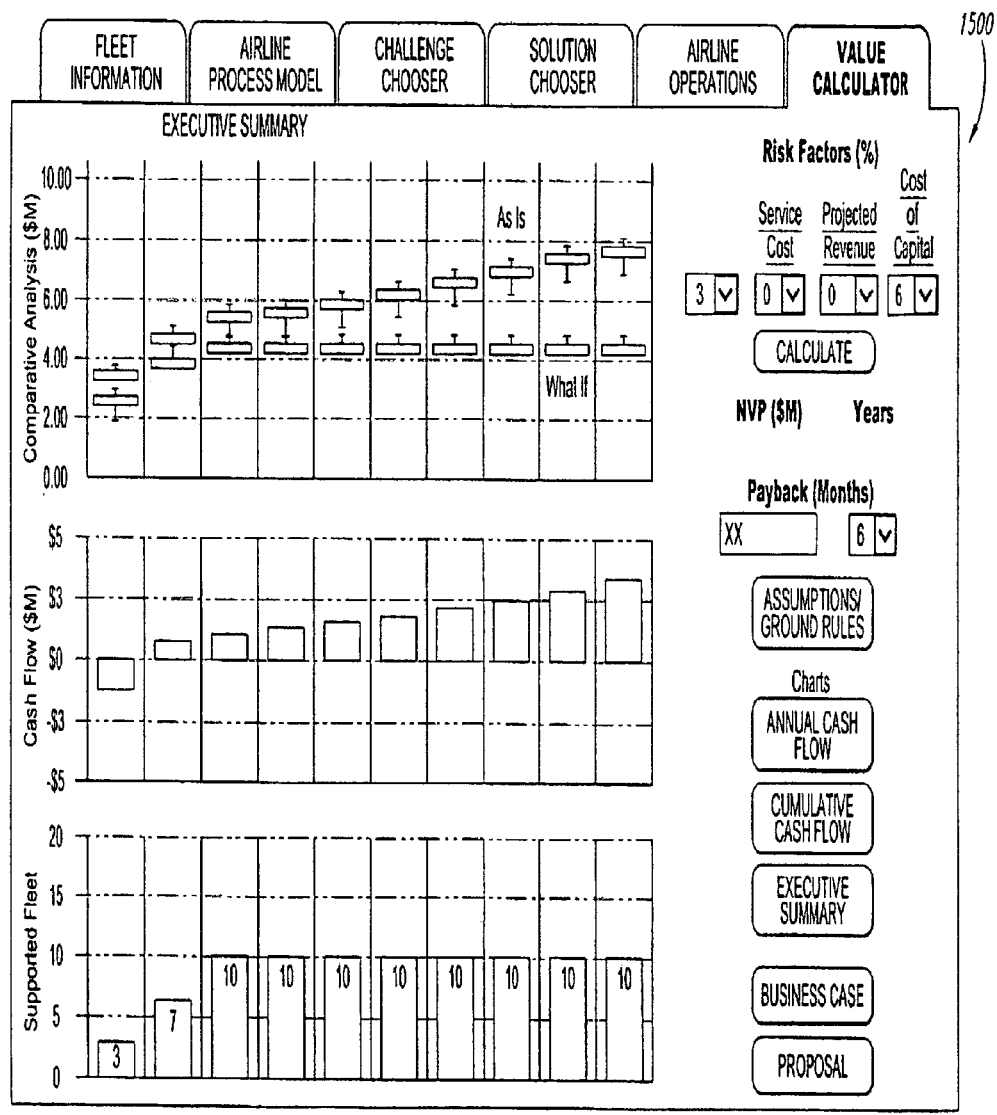
FIG. 15 is a schematic diagram of a display page that graphically describes the results of comparative analyses between an "as is" case and a corresponding "what if" case.
Figure 17:
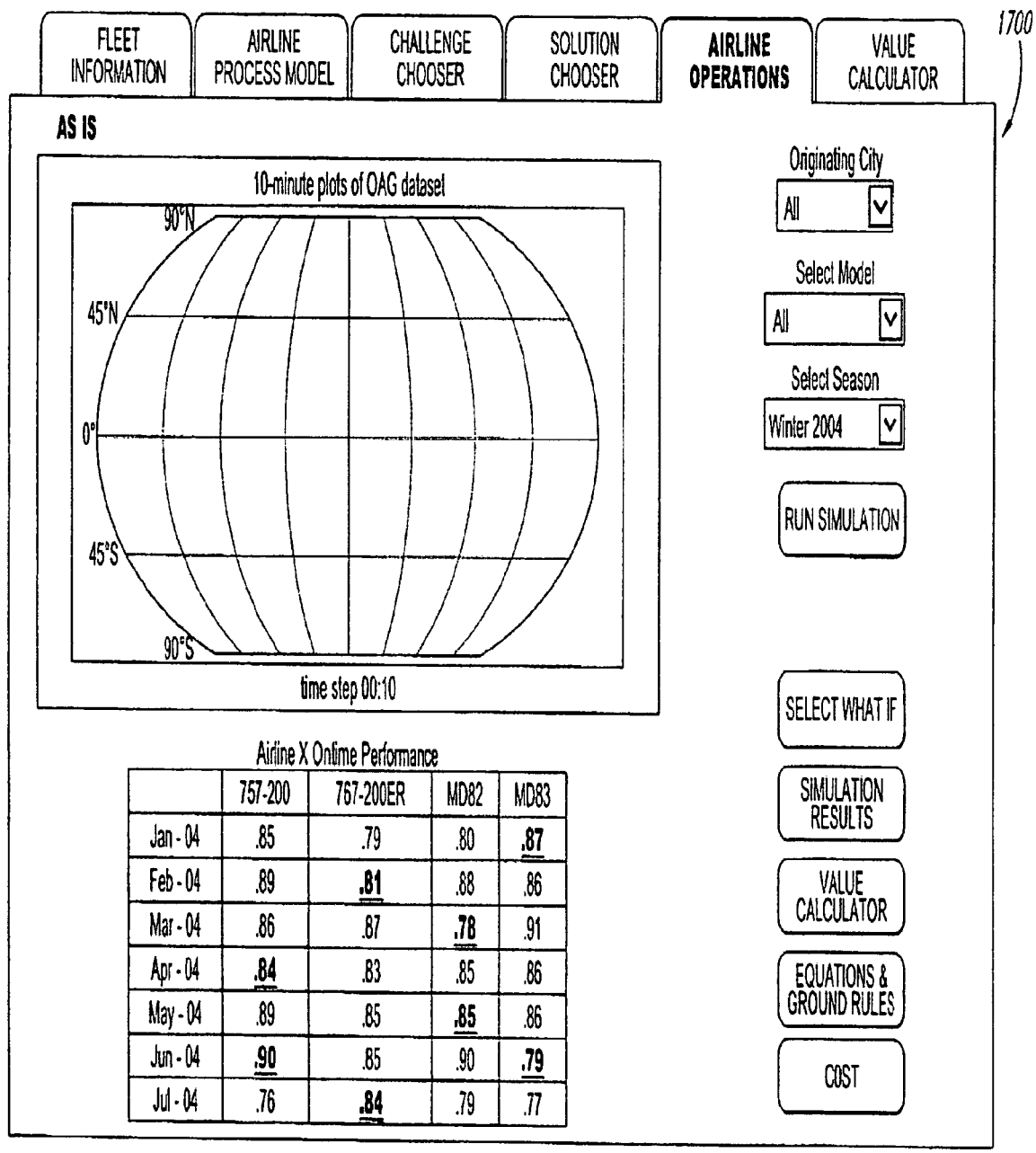
FIG. 17 is a schematic diagram of a display page providing airline schedule performance data.

In addition to the spreadsheet fields 1470 described above, the display page 1400 can also include a number of page selectors that can take the user to other forms of output related to the selected products and services. For example, by selecting a proposal button 1418, the user can request a print out of a products and services proposal to give the prospective customer. By selecting a business case button 1420, various portions of the relevant data described above can be assembled into a report with associated value analyses that can be printed out for the customer. Similarly, by selecting an executive summary button 1422, the user can request additional spreadsheet data, such as that illustrated in the display page 1500 of FIG. 15 which graphically describes the results of comparative analyses between the "as is" case and the "what if" case. The executive summary can additionally include spreadsheet data, such as that illustrated in a display page 1600 of FIG. 16, which allows the user to "scale-up" the benefits associated with the selected products and services for various portions of the current airline fleet and for future fleet growth. The executive summary can further graphical data and schedule performance data, such as that illustrated in a display page 1700 of FIG. 17.

In accordance with the present invention, a method is provided of accurately measuring the cost of service disruptions which takes into consideration service disruption data for each particular airline and the severity of disruptions according to each cause of disruptions. Briefly, the method of assessing the cost of the flight service disruptions in accordance with the present invention involves identifying the causes, costs and appropriate break-down of different service disruptions. The costs are then associated with the appropriate disruptions and a curve is established which reflects the accelerating rate at which the costs increase as the severity of the disruption grows. It is then necessary to establish the minimum data required to populate the model and provide meaningful results. The method allows root causes of the disruption sequences to be identified, thereby aiding in the marketing of solutions to customers.

Figure 18:
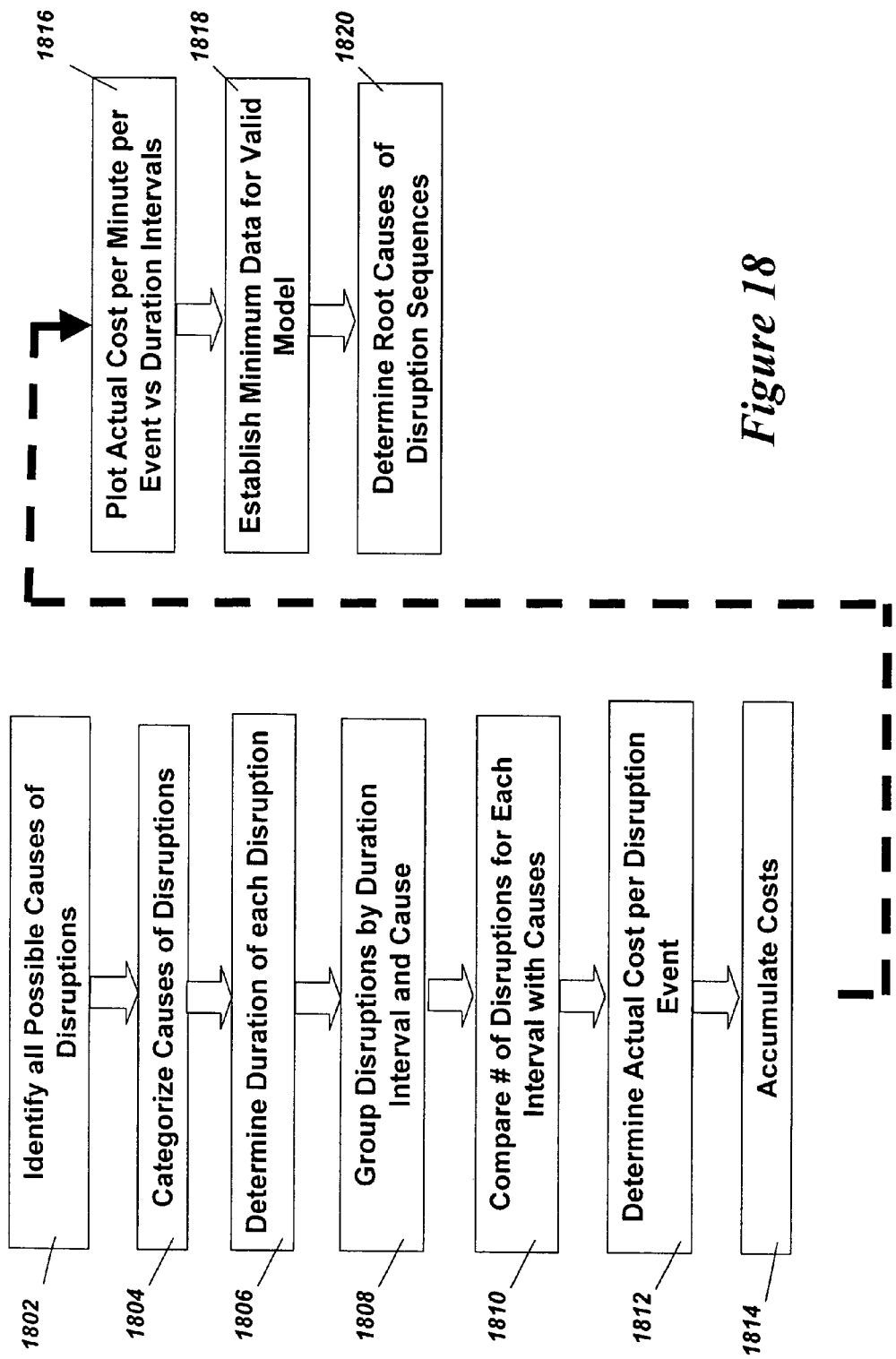
FIG. 18 is a flowchart showing the basic steps of a method for assessing the costs of service disruptions according to the present invention.

The basic steps of the method of the present invention are broadly shown in FIG. 18. The first step 1802 in the method involves identifying all possible causes of service disruptions. These causes will of course, depend upon the particular industry in which the method is used, however in the case of the airline industry, these causes are well known and documented, as will be discussed later below. Next, at step 1804, the causes of the disruptions are classified or categorized so that the major causes of disruptions are examined.

At step 1806, the duration (time) of each disruption is determined and recorded. Then, at step 1808, the total number of disruptions is grouped according to duration (time) interval and the cause of the disruption. As a result, as will be discussed later in more detail, the number of disruption events within a series of different time intervals is developed for each category of causes. At step 1812, a determination is made of the actual cost of each disruption event for each category of causes. In other words, a specific cost for disruption events is established for each of the causes, for each of the selected time intervals.

Those disruption events having longer durations are known to have higher cost per unit time of the event. Therefore, the average disruption costs per event are accumulated at 1814 to reflect this non-linear relationship. The cost having been established for each event and then accumulated, a curve is plotted at step 1816 which visually reveals the actual cost per minute of the disruption as a function of the selected duration intervals. It is also necessary, at step 1818 to assure that a minimum amount of data has been used to populate the cost calculation model so that accurate, meaningful results can be obtained. With the model having been developed, including curves revealing the distribution of costs based on duration, a determination can then be made at step 1820 of the root causes of the disruption sequences.

Figure 19:
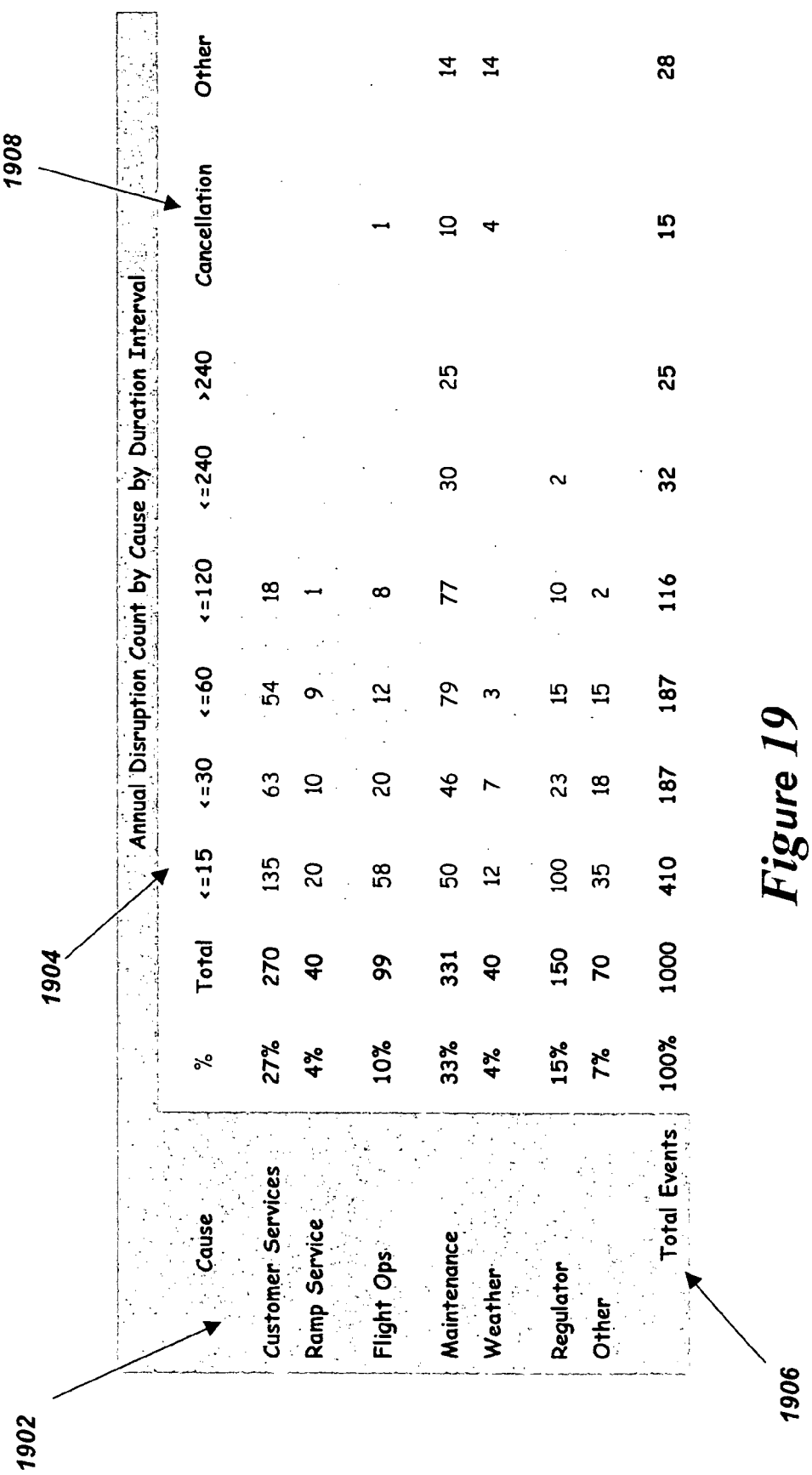
FIG. 19 is a table of data showing annual disruption count by cause and duration interval in accordance with an embodiment of the invention.

FIG. 19 is a table of data showing the distribution of disruption events as a function of cause of duration and duration intervals. In the illustrated example, the causes 1902 comprise customer services, ramp service, site operations, maintenance, weather, regulator and other causes. Regulator causes include, for example, the FAA, CAA and Homeland Security in the case of the United States. In this example, the total number of disruption events 1906 is 1,000. These 1,000 disruption events are categorized according to the duration 1904 of the event. In the illustrated embodiment, the time intervals chosen are 15 minutes or less, 30 minutes or less, 60 minutes or less, 120 minutes or less, 240 minutes or less, and greater than 240 minutes. Also, provision is made for events that result in flight cancellation 1908. The distribution of disruption events is also arranged by cause 1902. Thus, for example, it can be seen that of the 1,000 total events, 25 disruption events were due to maintenance causes that resulted in disruption delays of greater than 240 minutes. In the case of weather as a cause, 4 disruptions resulted in a flight cancellation 1908. The distribution of disruption count data shown in FIG. 19 is the result of steps 1802-1810.

Figure 20:
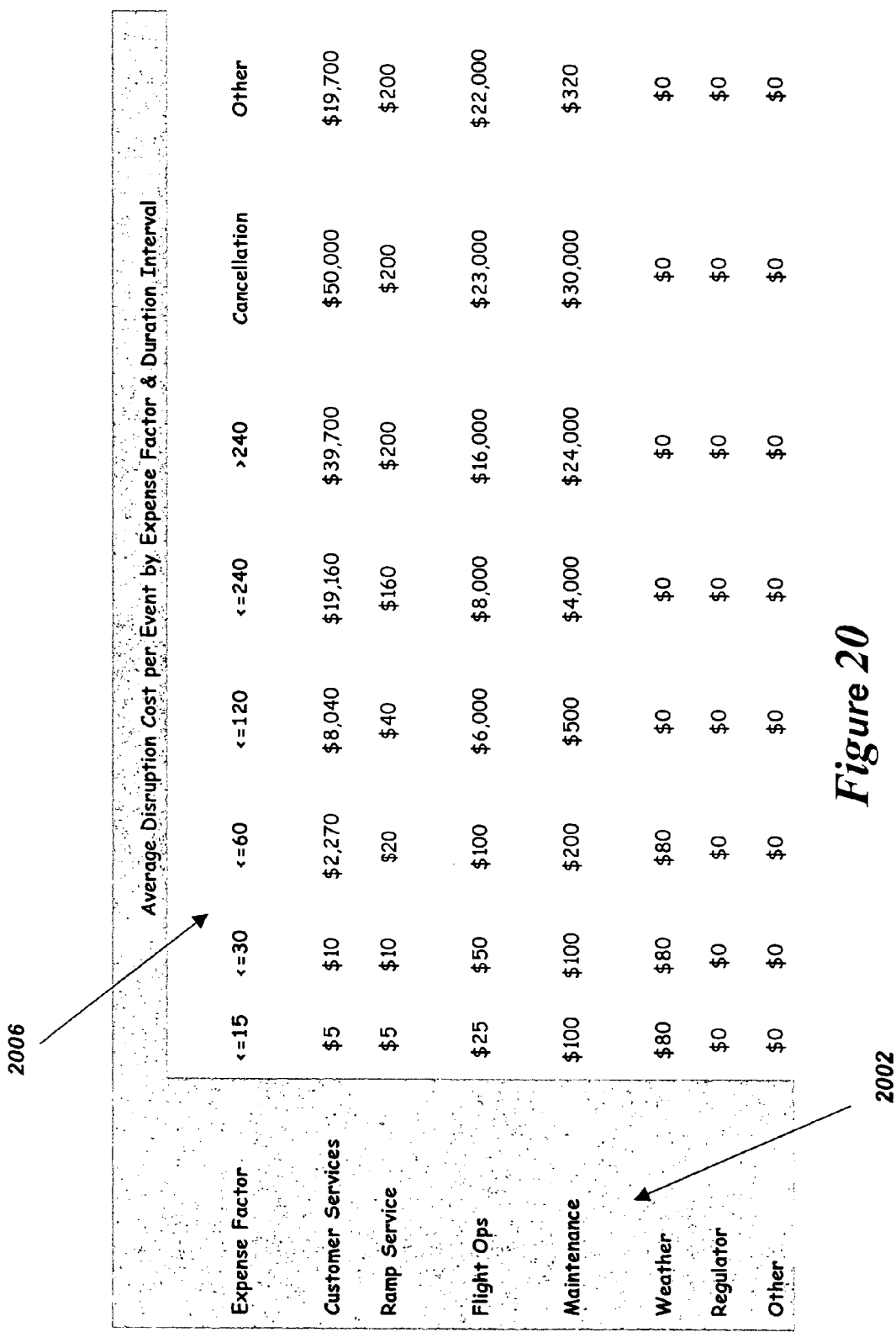
FIG. 20 is a table showing the average disruption cost per event by expense factor and duration interval, in accordance with an embodiment of the invention.

FIG. 20 represents the determination of the average cost per disruption event per Expense Factor 1812 (FIG. 18). The average disruption cost for each event is shown as a function of Expense Factors 2002 and duration intervals 2006. It can be seen that the Expense Factors 2002 are those related to the causes of disruptions 2102 shown in FIG. 21 and that the time intervals 2006 are identical to the time intervals 2104 shown in FIG. 21. In the case of the cost calculated in FIG. 20, it can be seen that each disruption event resulting from flight operations which had a duration greater than 240 minutes resulted in a cost of $16,000, while each maintenance-related disruption event causing flight cancellation resulted in a cost of $30,000.

The present invention involves, in part, recognition of the fact that those delays that are longer in duration tend to result in disproportionaly higher costs per event. In other words, a non-linear relationship exists between the cost-per-unit time of a disruption and the total duration of the disruption. Thus, in accordance with the present invention, the average disruption costs per event and Expense Factor shown in FIG. 20 are accumulated to reflect this non-linear relationship. FIG. 21 shows a set of data representing single event, accumulated direct disruption costs as function of Expense Factors 2102 and duration time intervals 2104. Thus, for example, a maintenance related event lasting longer than 240 minutes resulted in a calculated average disruption maintenance expense factor cost of $24,000 (FIG. 20) whereas, after accumulation of all related Expense Factors, increases to $79,900 as shown in FIG. 21. The accumulated costs shown in FIG. 21 for all the causes 2102 can be added and averaged to produce average single event costs 2106.

Figure 22:
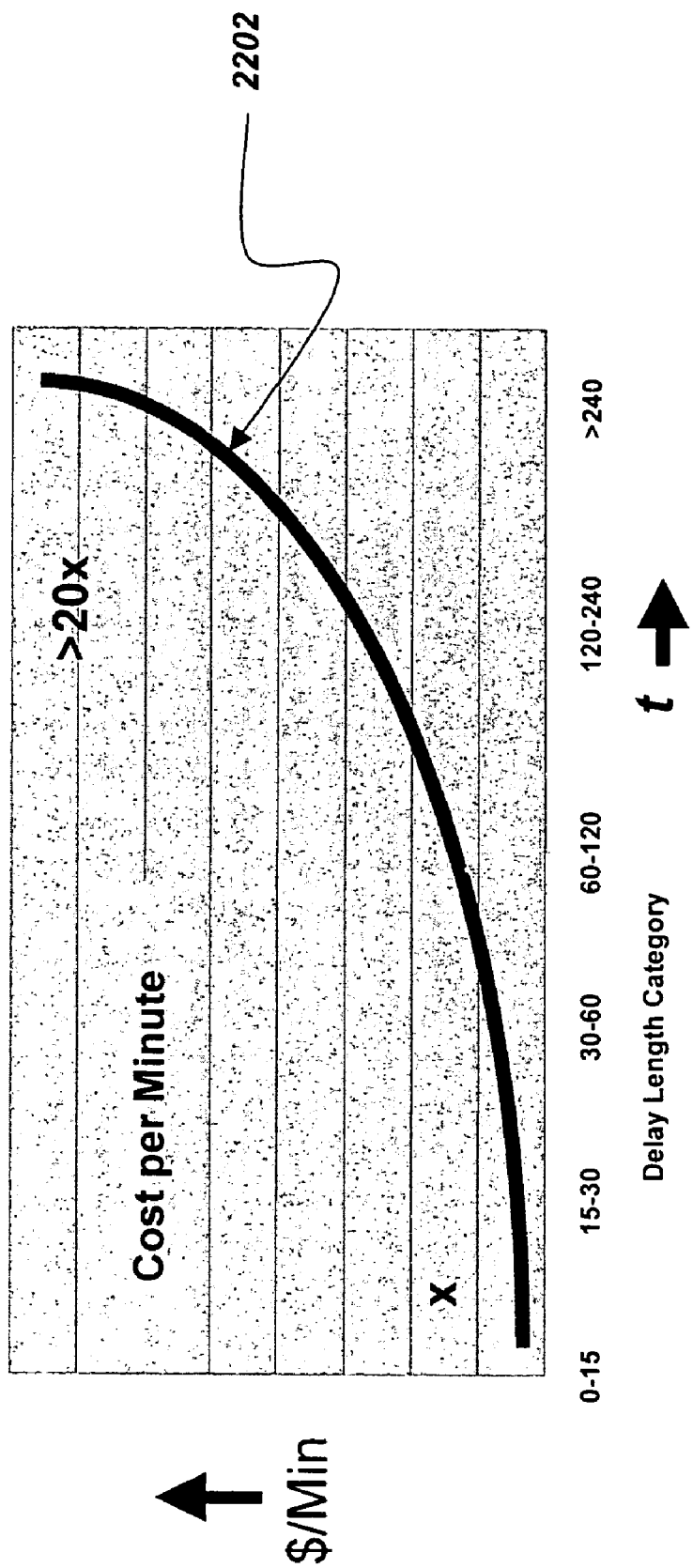
FIG. 22 is a sample plot showing a disruption cost curve, in accordance with an embodiment of the invention.

Using the methods and cost data developed as previously discussed, a curve 2202 can be plotted as shown in FIG. 22 which represents the cost per minute for disruption events as a function of the duration intervals previously discussed. It can be seen from FIG. 22 that the cost per minute of disruption events increases exponentially as the time interval of the delay increases. In other words, the severity of the consequences resulting from the delay increases non-linearly as the delay becomes longer.

Figure 23:
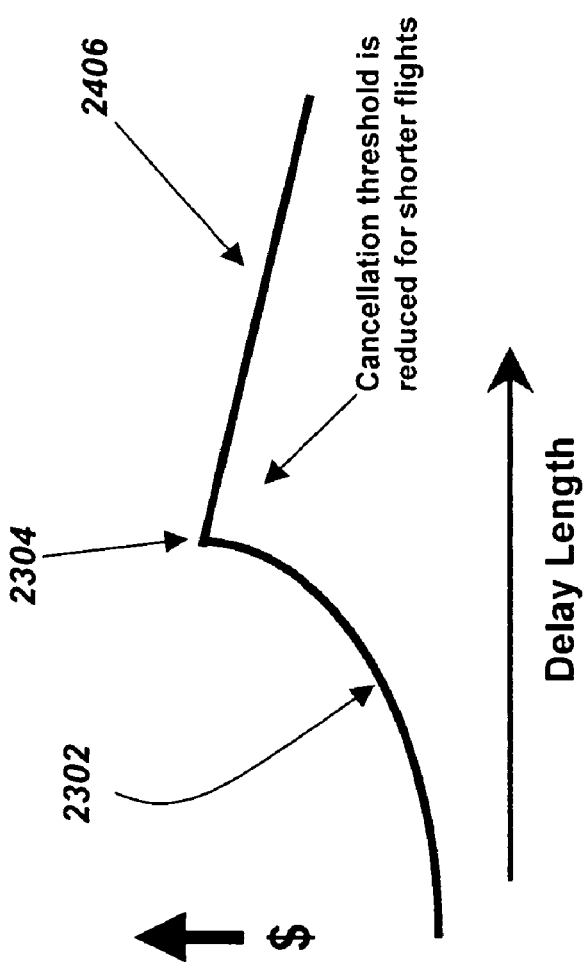
FIG. 23 is a graph showing the cost per minute for a disruption in a short haul commercial aircraft flight, in accordance with an embodiment of the invention.

The point in time when flight delays result in cancellations is dependent in part on the next available alternative flights and aircraft capacity. FIG. 23 is a plot of the cost per minute of disruptions as a function of the duration of the disruption for so-called "short haul" airline flights. The curve increases exponentially at 2302 until a peak cost per minute is reached at 2304. Following the peak at 2304, the cost per minute decreases, in this case linearly as shown at 2406. Short haul airline flight disruptions tend to convert into cancellations after relatively short periods since passengers can be more easily rescheduled on later flights which, in the case of short haul schedules, are more frequent. Similarly, aircraft are reintegrated back into the network relatively quickly after repair.

Figure 24:
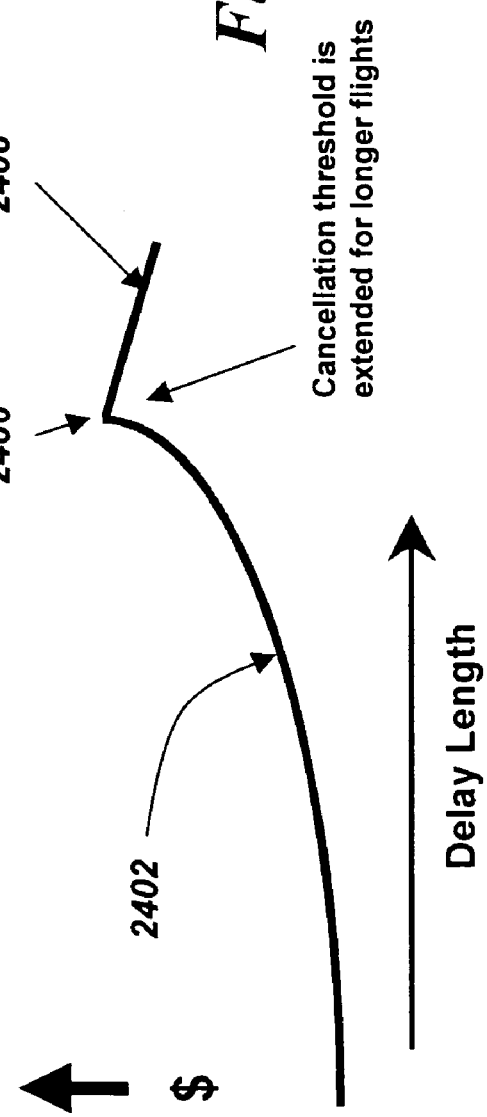
FIG. 24 is a graph showing the cost per minute for a disruption in a long haul commercial aircraft flight, in accordance with an embodiment of the invention.

FIG. 24 shows a plot of the cost per minute of disruption events as a function of event duration for "long haul" flights. In this case, the exponential portion 2402 of the curve tends to be prolonged, resulting in a peak rate at 2406 which occurs later compared to short haul flights. Following the peak at 2406, the costs per minute decrease at 2408. Long haul airline flight delays tend to be longer in duration before a cancellation results. This is because rescheduling of passengers on other flights is more difficult and there is greater reluctance to cancel flights because aircraft are in the wrong place to be repositioned.

Comparing the rate of increase of the exponential portions 2302, 2402 shown in FIGS. 23 and 24 respectively, it can be seen that the cost per minute of a short delay on a short haul flight (FIG. 23) can be greater than a longer delay on a long haul flight (FIG. 24).

Figure 25:
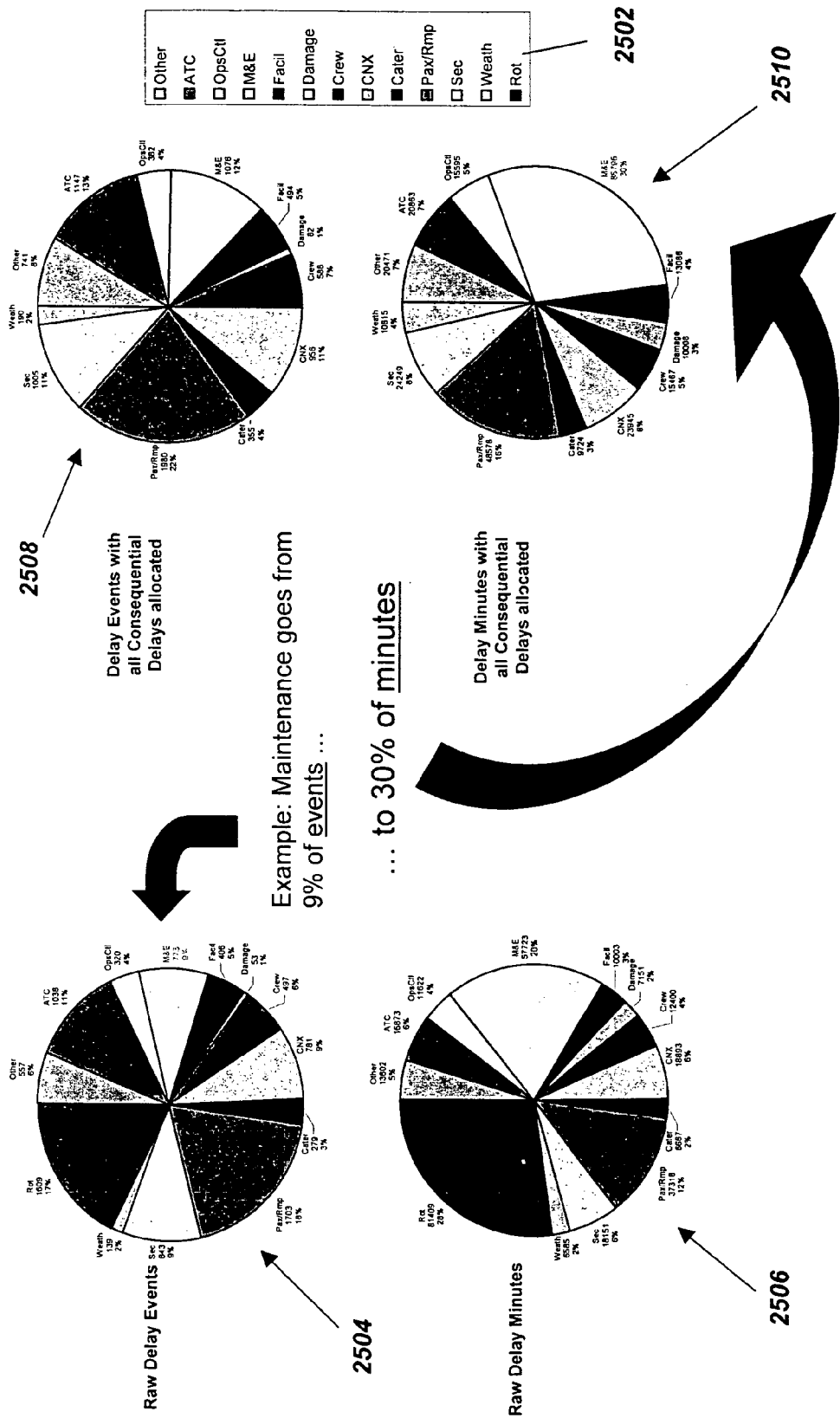
FIG. 25 is a series of pie charts showing how the cost assessment information developed in accordance with the present invention can be used better identify the areas of service disruptions having the greatest impact on operations and costs.

Attention is now directed to FIG. 25 depicting a series of pie charts developed using the data generated and discussed above which are helpful in determining root causes of disruptions. A key 2502 identifies the constituent parts of the pie charts, wherein the abbreviations have the following meanings:

| | |
|---|---|
| Other | Other |
| AT | Air Traffic Control |
| OpsCt | Operations Control |
| M & E | Maintenance and Engineering |
| Faci | Facilities |
| Damag | Damaged Aircraft |
| CREW | Flight Crew |
| CNX | Cancellation |
| Cate | Catering |
| Pax/Rm | Passengers |
| Se | Security |
| Weat | Weather |
| Rot | Rotation |

Chart 2504 depicts the raw delay events, i.e. the number of disruption delays for each of the categories shown in key 2502. Similarly, chart 2506 reveals the raw delay minutes for the disruption events for each of the categories shown in key 2502. Using the method of the present invention and the data generated as discussed above, pie charts 2508 and 2510 can be generated. Chart 2508 represents delay events with all consequential delays allocated, while chart 2510 represents the delay minutes with allocation of all the consequential delays. Thus, it can be seen, for example, from chart 2504 that disruption events caused by maintenance account for 9% of the total number of events, yet this 9% of events results in 30% of the total number of delay minutes, as shown by chart 2510. The charts shown in FIG. 25 are illustrative of the use of the method of the present invention and related data to provide an airline customer or operator with insight and increased visibility into the causes and effects of disruption events. The tools and graphical data provided by the method of the present invention thus allow the airline operators to efficiently allocate resources to the prevention of those disruption events that have the greatest impact on airline flight operations.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

What is claimed is:

1. A method of assessing the cost of service disruptions in a fleet of transportation vehicles, such as aircraft, comprising the computer implemented steps of:
   (A) determining a cause of each of the disruptions;
   (B) determining a duration of each of the disruptions related to a respective cause;
   (C) determining the number of disruptions related to a respective causes occurring during each of a plurality of graduated time intervals comprising said duration, each of said time intervals associated with a specifically determined cost per said time interval for each of said disruptions; and,
   (D) determining an accumulated cost of the service disruptions said accumulated cost determined by accumulating a cost over each of said plurality of time intervals, said accumulated cost comprising a non-linear relationship with respect to said duration of a respective disruption, said non-linear relationship determining an actual cost per unit time for a respective disruption, wherein said determining said accumulated cost comprises accumulating an averaged single event cost, said averaged single event cost determined by averaging costs over all of said disruptions comprising a respective time interval wherein said non-linear relationship determines an actual cost per unit time for said single event;
   (E) assigning expense factors respectively for disruptions resulting from each of the causes determined in step (A); and,
   (F) determining an average cost for each disruption over a respective time interval using said respective expense factor.

2. The method of claim 1, including the step of arranging the causes determined in step (A) into a plurality of groups of causes.

3. The method of claim 1, including the step of accumulating the average cost over each of said plurality of time intervals.

4. The method of claim 3, wherein the cost accumulation includes increasingly greater costs resulting from disruptions having respectively longer durations.

5. The method of claim 1, including the step of generating a graph visually representing, for each of the determined causes, said actual cost per unit time of each of the disruptions in relation to each of the time intervals.

6. The method of claim I, wherein the causes determined in step (A) include at least one of the following:
   a) customer services,
   b) aircraft ramp services,
   c) aircraft flight operations,
   d) maintenance,
   e) weather,
   f) government regulators.

7. A method of assessing the cost of service disruptions in a fleet of commercial aircraft, comprising the computer implemented steps of:
   (A) identifying the cause of each of the disruptions;
   (B) determining the severity of each of the disruptions, said severity comprising a duration of each of the disruptions, said duration comprising a plurality of graduated time intervals, each of said time intervals associated with a specifically determined cost per said time interval for each of said disruptions; and,
   (C) calculating the cost of disruptions based on the cause and the severity of each of the disruptions, said cost comprising an accumulated cost of the service disruptions, said accumulated cost calculated by accumulating a cost over each of said plurality of time intervals, said accumulated cost comprising a non-linear relationship with respect to said duration of a respective disruption, said non-linear relationship determining an actual cost per unit time for a respective disruption wherein said determining said accumulated cost comprises accumulating an averaged single event cost~said averaged single event cost determined by averaging costs over all of said disruptions comprising a respective time interval wherein said non-linear relationship determines an actual cost per unit time for said single event;
   (E) assigning expense factors respectively for disruptions resulting from each of the causes determined in step (A); and,
   (F) determining an average cost for each disruption over a respective time interval using said respective expense factor.

8. The method of claim 7, including the step of generating a visual model representing a relationship between said actual cost of a respective disruption per unit time and the severity of a respective disruption.

9. The method of claim 7, wherein step (B) includes grouping the disruption durations in said plurality of time intervals respectively representing the severity of the disruptions.

10. The method of claim 7, including the step of generating a curve that reflects the rate at which the actual cost of disruptions changes as the severity of the disruptions increases.

11. The method of claim 7, wherein the accumulation includes increasingly greater costs resulting from disruptions having respectively longer durations.

12. The method of claim 7, wherein the causes identified in step (A) include at least one of the following:
   a) customer services,
   b) aircraft ramp services,
   c) aircraft flight operations,
   d) maintenance,
   e) weather,
   f) government regulators.

13. A method of assessing the cost of service disruptions in a fleet of commercial aircraft, comprising the computer implemented steps of:
   (A) identifying a plurality of causes for the service disruptions;
   (B) for each of the causes determined in step (A), determining the number of disruptions comprising each of a plurality of graduated time intervals, said time intervals comprising a duration of each of said disruptions, each of said graduated time intervals associated with a specifically determined cost per said time interval for each of said disruptions; and,
   (C) calculating a cost of the disruptions based on the causes determined in step (A) and the number of disruptions for each time interval determined in step (B), said cost comprising an accumulated cost of the service disruptions, said accumulated cost calculated by accumulating a cost for each of the disruptions over each of said plurality of time intervals, said accumulated cost comprising a non-linear relationship with respect to said duration of a respective disruption, said non-linear relationship determining an actual cost per unit time for a respective disruption, wherein said determining said accumulated cost comprises accumulating an averaged single event cost, said averaged single event cost determined by averaging costs over all of said disruptions comprising a respective time interval wherein said non-linear relationship determines an actual cost per unit time for said single event;
   (D) assigning expense factors respectively for disruptions resulting from each of the causes determined in step (A); and,
   (E) determining an average cost for each disruption over a respective time interval using said respective expense factor.

14. The method of claim 13, wherein the step of accumulating comprises increasingly greater costs for those disruptions having respectively longer durations.

15. A method of claim 13, including the step of generating a visual curve representing the mathematical relationship between the actual cost of disruptions per unit of time and the duration of the disruption.

16. The method of claim 13, including the step of preparing a graphical display showing the relationship between a cause of a respective disruption, a duration of a respective disruption and the actual cost of a respective disruption.

* * * * *